(12) United States Patent
Cannon et al.

(10) Patent No.: US 7,152,798 B2
(45) Date of Patent: Dec. 26, 2006

(54) LASER SCANNING UNIT HAVING A SENSOR FOR DETECTING BOTH START-OF-SCAN AND END-OF-SCAN POSITIONS OF A CORRESPONDING LASER BEAM

(75) Inventors: Roger S. Cannon, Nicholasville, KY (US); Kevin M. Hargrave, Lexington, KY (US); Philip J. Heink, Lexington, KY (US); Christopher D. Jones, Georgetown, KY (US); Danny W. Peters, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 276 days.

(21) Appl. No.: 10/808,131

(22) Filed: Mar. 24, 2004

(65) Prior Publication Data

US 2005/0211781 A1   Sep. 29, 2005

(51) Int. Cl.
 *G06K 7/10* (2006.01)
(52) U.S. Cl. .......................... 235/462.33; 265/462.36; 265/462.17

(58) Field of Classification Search ........... 235/462.33, 235/462.35, 462.36, 462.37, 462.38, 462.39, 235/462.17; 347/250, 260, 261, 238, 239, 347/255, 256; 395/653
See application file for complete search history.

(56) References Cited

U.S. PATENT DOCUMENTS 5,877,798 A * 3/1999 Clarke et al. ................ 347/250
6,657,650 B1 12/2003 Omelchenko et al.

* cited by examiner

*Primary Examiner*—Karl D. Frech
(74) *Attorney, Agent, or Firm*—Stevens & Showalter, LLP

(57) ABSTRACT

A laser scanning unit is provided. It comprises a housing; a scanning device; a pre-scan assembly generating a light beam and directing the light beam toward the scanning device; and a post-scan optical assembly receiving a scanning beam reflected from the scanning device and causing the beam to traverse a photoconductive member along a scan path. The post-scan optical assembly comprises a sensor for detecting the beam at a start-of-scan location and an end-of-scan location along the scan path.

21 Claims, 19 Drawing Sheets

LASER SCANNING UNIT HAVING A SENSOR FOR DETECTING BOTH START-OF-SCAN AND END-OF-SCAN POSITIONS OF A CORRESPONDING LASER BEAM

CROSS REFERENCE TO RELATED APPLICATION

The present application is related to U.S. patent application Ser. No. 10/808,130, entitled "Systems for Performing Laser Beam Linearity Correction and Algorithms and Methods for Generating Linearity Correction Tables from Data Stored in an Optical Scanner," which is filed concurrently with this application and hereby incorporated by reference herein.

BACKGROUND OF THE INVENTION

1. Field of the Invention

The present invention relates generally to a laser scanning unit, and more particularly, to such a unit having a sensor for detecting both start-of-scan and end-of-scan positions of a corresponding laser beam.

2. Description of Related Prior Art

Multi-laser color printers having a plurality of printheads are known in the prior art. Typically, each printhead generates a corresponding scanning laser beam for creating a latent image on a corresponding photoconductive drum. Each latent image is developed and may be transferred to an intermediate transfer belt so as to form a composite image, which is later transferred to a substrate. Each color image must be accurately registered relative to all of the other color images to ensure that print quality is satisfactory. During operation of the printer, the length of scan lines generated by a scanning laser beam may drift, i.e., change, resulting in its corresponding developed image being out of register with the other color images. So as to sense changing scan line length, start-of-scan and end-of-scan sensors may be associated with each laser beam.

It would be desirable if scan line length changes could be sensed without requiring costly start-of-scan and end-of-scan sensors for each laser beam in a color laser printer.

SUMMARY OF THE INVENTION

This need is met by the present invention wherein an electrophotographic machine is provided having a laser scanning unit including a single sensor for detecting both start-of-scan and end-of-scan positions of a corresponding laser beam. In one embodiment, a single sensor is provided for a pair of laser beams. One of the two laser beams is selected to traverse the single sensor during each scan of the selected beam along its scan path. The start-of-scan and end-of-scan signals generated by the single sensor are provided to an controller which, based upon the start-of-scan and end-of-scan signals, controls the writing of pels or pixels by the two beams along one or two photoconductive surfaces.

In accordance with a first aspect of the present invention, a laser scanning unit is provided. It comprises a housing; a scanning device; a pre-scan assembly generating a light beam and directing the light beam toward the scanning device; and a post-scan assembly receiving a scanning beam reflected from the scanning device and causing the beam to traverse a photoconductive member along a scan path. The post-scan assembly comprises a sensor for detecting the beam at a start-of-scan location and an end-of-scan location along the scan path.

The post-scan assembly may further comprise a first element for directing the light beam toward the sensor so as to permit the sensor to sense the beam at the start-of-scan location along the scan path and a second element for directing the beam toward the sensor to permit the sensor to sense the beam at the end-of-scan location along the scan path.

The scanning device may comprise a rotating polygonal mirror having at least one facet, wherein the pre-scan assembly directs the light beam toward the at least one facet at an oblique angle.

The post-scan assembly may still further comprise: a first lens positioned prior to the sensor for receiving the beam when the beam is at its start-of-scan location and focusing the beam onto the sensor; and a second lens positioned prior to the sensor for receiving the beam when the beam is at its end-of-scan location and focusing the beam onto the sensor.

The beam may be rotated in a first direction relative to a process direction axis of the housing at the start-of-scan location and prior to passing through the first lens and the beam may be rotated in a second direction relative to the process direction axis at the end-of-scan location and prior to passing through the second lens, wherein the first direction is opposite the second direction.

The first lens may have a cylindrical surface for focusing the beam in a direction substantially parallel to a first lens process dimension axis and the second lens may have a cylindrical surface for focusing the beam in a direction substantially parallel to a second lens process dimension axis.

The first lens may be rotated in the first direction such that its first lens axis is positioned at an angle relative to the process direction axis of the housing so as to correct at least a portion of the beam rotation in the first direction. Preferably, the first lens is positioned such that its first lens axis is positioned at angle relative to the process direction axis which is greater than the angle at which the beam is rotated relative to the process direction axis at the start-of-scan location.

The second lens may be rotated in the second direction such that its second lens axis is positioned at an angle relative to the process direction axis so as to correct at least a portion of the beam rotation in the second direction. Preferably, the second lens is positioned so that its second lens axis is positioned at angle relative to the process direction axis which is greater than the angle at which the beam is rotated relative to the process direction axis at the end-of-scan location.

Each of the first and second lenses may further comprise a generally spherical surface.

In accordance with a second aspect of the present invention, a laser scanning unit is provided. It comprises: a housing; a scanning device; a first pre-scan assembly generating first and second light beams and directing the first and second light beams toward the scanning device; a second pre-scan assembly generating third and fourth light beams and directing the third and fourth light beams toward the scanning device; and a post-scan assembly receiving the first, second, third and fourth scanning beams reflected from the scanning device and causing the beams to move along a corresponding scan path. The post-scan assembly comprises a first sensor for detecting one of the first and second light beams at a start-of-scan location and an end-of-scan location along a corresponding scan path; and a second sensor for detecting one of the third and fourth light beams at a start-of-scan location and an end-of-scan location along a corresponding scan path.

The post-scan assembly may further comprise: a first element for directing the one of the first and second light beams toward the first sensor to sense the one first or second beam at the start-of-scan location along the corresponding scan path, a second element for directing the one of the first and second beams toward the first sensor to sense the one first or second beam at the end-of-scan location along the corresponding scan path, a third element for directing the one of the third and fourth light beams toward the second sensor to sense the one third or fourth light beam at the start-of-scan location along the corresponding scan path, and a fourth element for directing the one of the third, and fourth light beams toward the second sensor to sense the one third or fourth light beam at the end-of-scan location along the corresponding scan path.

Preferably, the first and second sensors are mounted on a common circuit card. The first and second sensors may be mounted adjacent to one another on the circuit card. The circuit card may comprise opaque material where the first and second sensors are mounted.

The post-scan assembly may additionally comprise: a first lens positioned prior to the first sensor for receiving the one of the first and second light beams when the one first or second light beam is at its corresponding start-of-scan location and focusing the one first or second light beam onto the first sensor; a second lens positioned prior to the first sensor for receiving the one of the first and second light beams when the one first or second light beam is at its corresponding end-of-scan location and focusing the one first or second light beam onto the first sensor; a third lens positioned prior to the second sensor for receiving the one of the third and fourth light beams when the one third or fourth light beam is at its corresponding start-of-scan location and focusing the one third or fourth light beam onto the second sensor; and a fourth lens positioned prior to the second sensor for receiving the one of the third and fourth light beams when the one third or fourth light beam is at its corresponding end-of-scan location and focusing the one third or fourth light beam onto the second sensor.

The scanning device may comprise a rotating polygonal mirror having a plurality of facets. The first pre-scan assembly may direct each of the first and second light beams toward a common facet at an oblique angle and the second pre-scan assembly may direct each of the third and fourth light beams toward a common facet at an oblique angle.

The one of the first and second beams may be rotated in a first direction relative to a process direction axis of the housing at its corresponding start-of-scan location, and the one of the first and second beams may be rotated in a second direction relative to the process direction axis of the housing at its corresponding end-of-scan location, wherein the first direction is opposite the second direction.

The first lens may have a cylindrical surface for focusing the one of the first and second beams in a direction substantially parallel to a first lens process dimension axis and the second lens may have a cylindrical surface for focusing the one of the first and second beams in a direction substantially parallel to a second lens process dimension axis.

The first lens may be rotated in the first direction such that its first lens axis is positioned at an angle relative to the process direction axis of the housing so as to correct at least a portion of the rotation of the one of the first and second beams in the first direction. The second lens may be rotated in the second direction such that its second lens axis is positioned at an angle relative to the process direction axis of the housing so as to correct at least a portion of the rotation of the one of the first and second beams in the second direction.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
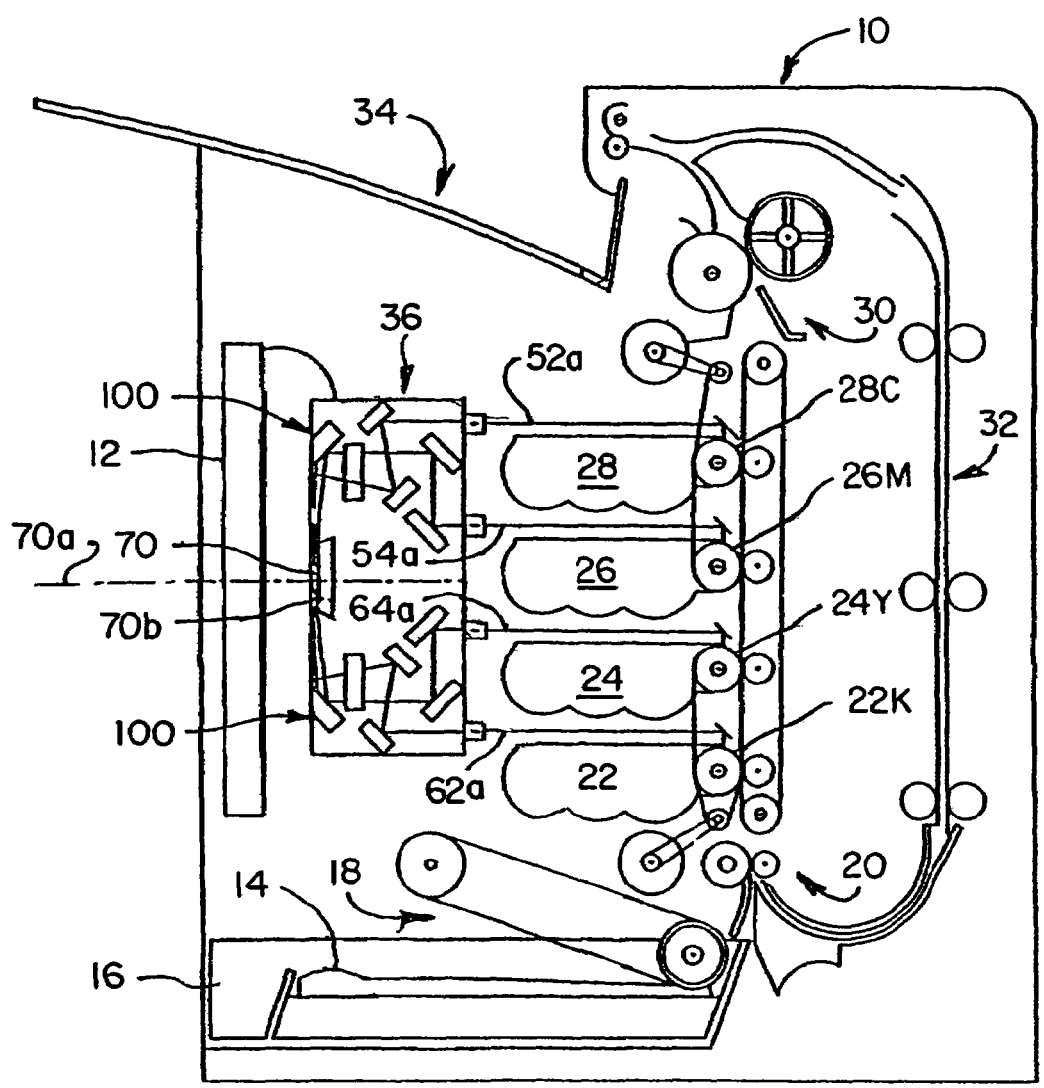
FIG. 1 is a schematic illustration of an electrophotographic image forming apparatus including a printhead constructed in accordance with the present invention.

FIG. 1 depicts a representative electrophotographic image forming apparatus, such as a color laser printer, which is indicated generally by the numeral 10. An image to be printed is electronically transmitted to a controller 12 by an external device (not shown). The controller 12 includes system memory, one or more processors, and other logic necessary to control the functions of electrophotographic imaging.

In performing a printing operation, the controller 12 initiates an imaging operation where a top sheet 14 of a stack of media is picked up from a media tray 16 by a pick mechanism 18 and is delivered to a media transport belt 20. The media transport belt 20 carries the sheet 14 past each of four image forming stations 22, 24, 26, 28, which apply toner to the sheet 14. The image forming station 22 includes a photoconductive drum 22K that delivers black toner to the sheet 14 in a pattern corresponding to a black image plane of the image being printed. The image forming station 24 includes a photoconductive drum 24Y that delivers yellow toner to the sheet 14 in a pattern corresponding to a yellow image plane of the image being printed. The image forming station 26 includes a photoconductive drum 26M that delivers magenta toner to the sheet 14 in a pattern corresponding to a magenta image plane of the image being printed. The image forming station 28 includes a photoconductive drum 28C that delivers cyan toner to the sheet 14 in a pattern corresponding to a cyan image plane of the image being printed.

The media transport belt 20 then carries the sheet 14 with the unfixed toner image superposed thereon to a fuser assembly 30, which applies heat and pressure to the sheet 14 so as to promote adhesion of the toner thereto. Upon exiting the fuser assembly 30, the sheet 14 is either fed into a duplexing path 32 for performing a duplex printing operation on a second surface of the sheet 14, or the sheet 14 is conveyed from the apparatus 10 to an output tray 34.

To effect the imaging operation, the controller 12 manipulates and converts data defining each of the CYMK image planes into separate corresponding laser pulse video signals, and the video signals are then communicated to a printhead 36 (also referred to herein as a "laser scanning unit"). The printhead 36 comprises a printhead housing 37, see FIGS. 2 and 3, which is preferably formed as a molded component. The housing 37 includes a top section 37a, illustrated in FIG. 2, and a bottom section 37b, illustrated in FIG. 3. The printhead 36 further includes a single rotatable polygonal mirror 70 and a pre-scan optical assembly 40 comprising first and second pre-scan laser diode/lens assemblies 50 and 60. The pre-scan assemblies 50 and 60 are spaced apart from one another by an angle of approximately 120 degrees, see FIG. 2. The mirror 70 is supported for rotation about a rotational axis 70a, driven by an appropriate motor 70b and comprises a plurality of facets 72, see FIGS. 1, 2, 4 and 5.

Figure 2:
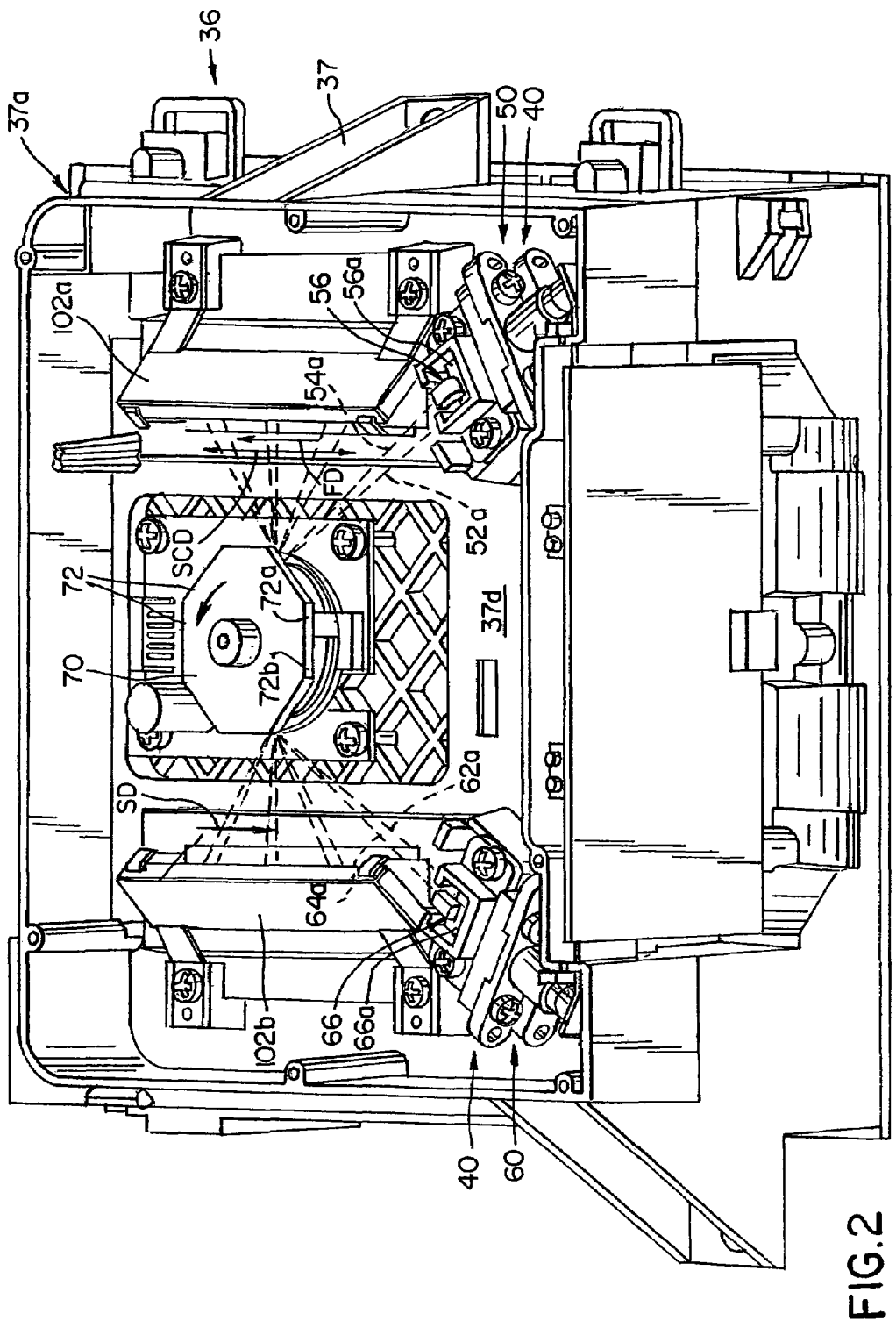
FIG. 2 is a perspective view of the printhead illustrating a polygonal mirror, first and second pre-scan assemblies and a top section of the printhead housing.
Figure 4:
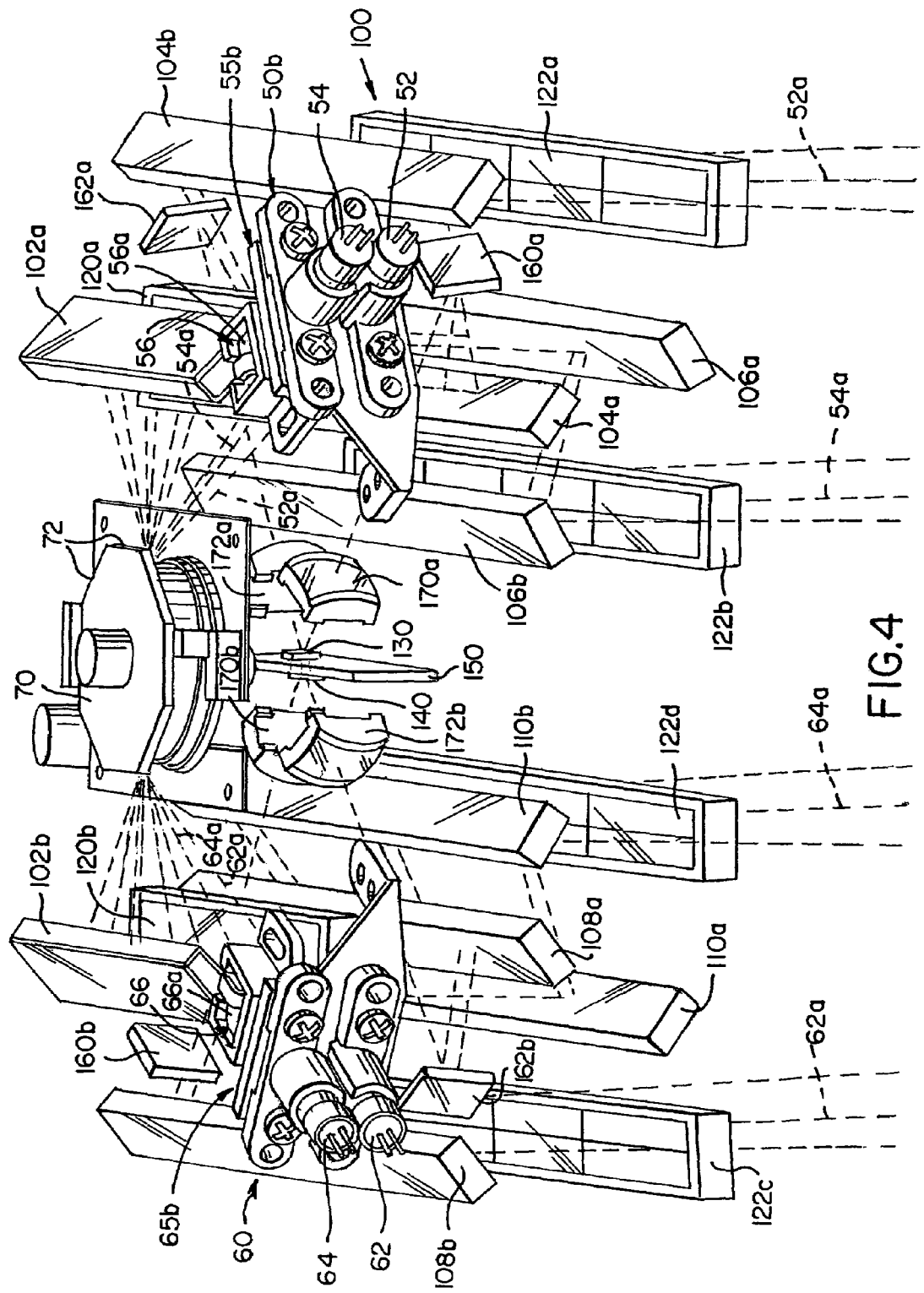
FIGS. 4 and 5 are perspective views of the polygonal mirror, the first and second pre-scan assemblies and the post-scan optical assembly with the printhead housing removed.

The first pre-scan assembly 50 comprises first and second laser diodes 52 and 54, see FIG. 4, each of which generates a corresponding laser beam 52a and 54a, see also FIG. 2. The first assembly 50 additionally includes first and second collimation assemblies 55a (only the second assembly 55b is shown in FIG. 4; the first collimation assembly is located directly below the second assembly 55b) for receiving respectively the first and second beams 52a and 54a. Each collimation assembly comprises a collimation lens (not shown) for collimating its corresponding laser beam 52a, 54a. Further provided is a first pre-scan lens assembly 56 comprising a single pre-scan lens 56a for receiving the first and second collimated beams 52a and 54a. The pre-scan lens 56a functions to redirect the beams 52a and 54a such that they converge at or near a common spot or location on a common polygon facet, see FIGS. 2, 4 and 5. The pre-scan lens 56a further functions to focus or converge each beam 52a and 54a in a process direction, which is generally parallel to the rotational axis 70a of the mirror 70, without causing convergence of the beam in a scan direction. The scan direction is indicated by arrow SCD in FIG. 2, and is substantially orthogonal to the rotational axis of the mirror 70.

Figure 5:
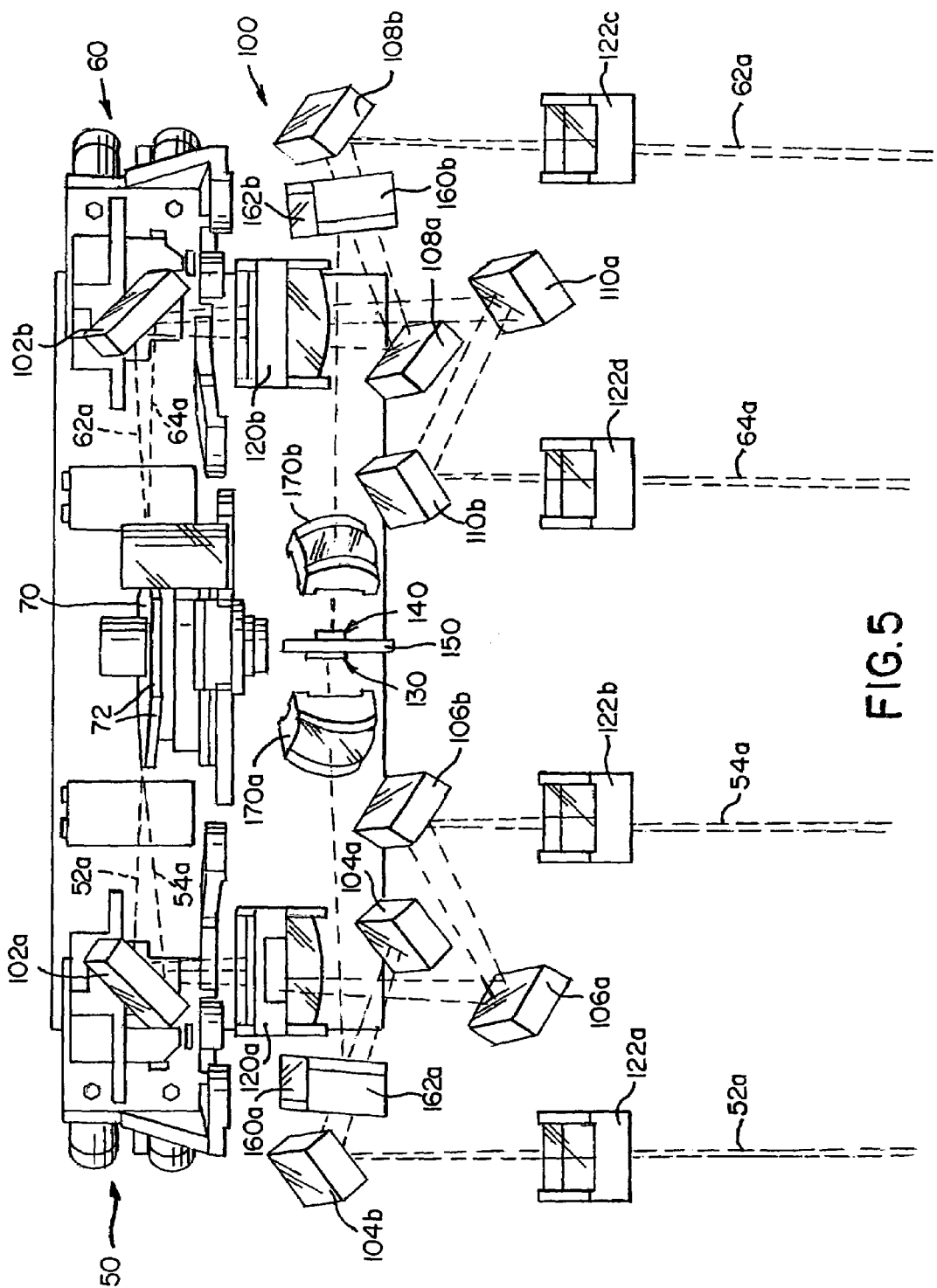

The first and second beams 52a and 54a are positioned in the same plane, which plane is substantially parallel to the rotational axis 70a of the mirror 70 and perpendicular to a rotational plane of the polygonal mirror, see FIGS. 2, 4 and 5. In addition, the first and second beams 52a and 54a are positioned on opposing sides of the rotational mirror plane at an angle of about 3 degrees to the plane such that an angle of six degrees is defined between the two beams 52a, 54a. Hence, the first and second beams 52a and 54b strike a common facet at oblique angles in the plane substantially perpendicular to the rotational plane of the mirror.

The second pre-scan assembly 60 comprises third and fourth laser diodes 62 and 64, each which generates a corresponding laser beam 62a and 64a, see FIG. 4. The second assembly 60 also includes third and fourth collimation assemblies 65a (only the fourth assembly 65b is illustrated in FIG. 4; the third assembly is located directly below the fourth assembly 65b) for receiving respectively the third and fourth laser beams 62a and 64a. Each collimation assembly comprises a collimation lens (not shown) for collimating the third and fourth beams 62a and 64a. Further provided is a second pre-scan lens assembly 66 comprising a single pre-scan lens 66a for receiving the third and fourth collimated beams 62a and 64a. The pre-scan lens 66a functions to redirect the beams 62a and 64a such that they converge at or near a common spot or location on a common polygon facet, see FIG. 2. The pre-scan lens 66a further functions to focus or converge each beam 62a and 64a in the process direction, without causing convergence of the beam in the scan direction.

The third and fourth beams 62a and 64a are positioned in the same plane, which plane is substantially parallel to the rotational axis 70a of the mirror 70 and perpendicular to the rotational plane of the rotating polygonal mirror. In addition, the third and fourth beams 62a and 64a are positioned on opposing sides of the rotational mirror plane at an angle of about 3 degrees to the plane such that an angle of six degrees is defined between the two beams 62a, 64a. Hence, the third and fourth beams 62a and 64a strike a common facet at oblique angles in a plane substantially perpendicular to the rotational plane of the mirror.

Each of the laser beams 52a, 54a, 62a, 64a is modulated so as to write pixels or Pels according to an associated one of the video signals from the controller 12 as the beam scans along a corresponding scan path. In particular, the first laser beam 52a is modulated according to a video signal corresponding to the cyan image plane. The second laser beam 54a is modulated according to a video signal corresponding to the magenta image plane. The third laser beam 62a is modulated according to a video signal corresponding to the black image plane. The fourth laser beam 64a is modulated according to a video signal corresponding to the yellow image plane.

Each laser beam 52a, 54a, 62a, 64a is reflected off the rotating polygonal mirror 70 and is directed towards a corresponding one of the photoconductive drums 28C, 26M, 24Y, 22K by select mirrors and lenses in a post-scan optical assembly 100, see FIGS. 4 and 5. The first and second beams 52a, 54a, after being reflected off the rotating polygonal mirror 70, are reflected by a reflection mirror 102a and pass through a first F-1 lens 120a, see FIGS. 4 and 5. The F-1 lens 120a functions to focus or converge each beam 52a, 54a to a point in the scan direction. The lens 120a may also function to effect a slight reduction in laser beam velocity variation in the scan direction. It is also contemplated that scan velocity non-linearity may be at least partially corrected electronically as discussed in the patent application entitled "Systems for Performing Laser Beam Linearity Correction and Algorithms and Methods for Generating Linearity Correction Tables from Data Stored in an Optical Scanner," which has previously been incorporated by reference herein. After passing through the first F-1 lens 120a, the first beam 52a is reflected by first beam mirrors 104a and 104b prior to passing through a corresponding first F-2 lens 122a, see FIGS. 4 and 5. The second beam 54a, after passing through the first F-1 lens 120a, is reflected by second beam mirrors 106a and 106b prior to passing through a corresponding second F-2 lens 122b. The first and second F-2 lenses 122a and 122b function to complete the convergence of their corresponding beams 52a, 54a along the process direction. The rotation of the polygonal mirror 70 and positioning of the mirrors 102a, 104a, 104b, 106a, 106b and lenses 120a, 122a, 122b of the post-scan optical assembly 100 causes each laser beam 52a, 54a to repeatedly sweep, along a corresponding scan path in the scan direction, across its corresponding photoconductive drum 28C, 26M so as to write Pels to form a latent image on the drum.

After being reflected by the mirror 70, the third and fourth beams 62a and 64a are reflected by a reflection mirror 102b and pass through a second F-1 lens 120b, see FIGS. 4 and 5. The F-1 lens 120b functions to focus or converge each beam 62a, 64a to a point in the scan direction. The lens 120b may also function to effect a slight reduction in laser beam velocity variation in the scan direction. After passing through the second F-1 lens 120b, the third beam 62a is reflected by third beam mirrors 108a and 108b prior to passing through a corresponding third F-2 lens 122c. The fourth beam 64a, after passing through the second F-1 lens 120b, is reflected by fourth beam mirrors 110a and 110b prior to passing through a corresponding fourth F-2 lens 122d. The third and fourth F-2 lenses 122c and 122d function to complete the convergence of their corresponding beams 62a, 64a along the process direction. The rotation of the polygonal mirror 70 and positioning of the mirrors 102b, 108a, 108b, 110a, 110b and lenses 120b, 122c, 122d of the post-scan optical assembly 100 causes each laser beam 62a, 64a to repeatedly sweep, along a corresponding scan path in the scan direction, across its corresponding photoconductive drum 22K, 24Y so as to write Pels to form a latent image thereon.

Presuming that the polygonal mirror 70 is rotating in a counter-clockwise direction, as viewed in FIG. 2, the first and second beams 52a and 54a are scanned in a first direction indicated by the first directional arrow FD, while the third and fourth laser beams 62a and 64a are scanned in a second direction indicated by the second directional arrow SD. For each scan of a laser beam 52a, 54a, 62a, 64a along its corresponding photoconductive drum 28C, 26M, 24Y, 22K, the controller 12 waits until the beam is at a desired position along its corresponding scan path before sending appropriate video signals to the corresponding laser diode 52, 54, 62, 64 to effect the writing of Pels or data along the drum.

In the illustrated embodiment, the printhead 36 further comprises a first start-of-scan/end-of-scan (SOS/EOS) sensor 130 and a second start-of-scan/end-of-scan (SOS/EOS) sensor 140. Both sensors 130, 140 are mounted on opposing sides of a common circuit board 150 which, in turn, is fixedly mounted to the bottom section 37b, i.e., a bottom surface 37c of a central member 37d, of the printhead housing 36, see FIGS. 3 and 3A. The circuit board 150 may be formed from a conventional composite material, such as a conventional fiber-reinforced polymeric material and, preferably, includes an opaque material, such as a metal film, incorporated into the polymeric material, at least in the areas near the sensors 130, 140, so as to prevent light energy from passing through the circuit board 150 near a sensor 130, 140.

Figure 3:
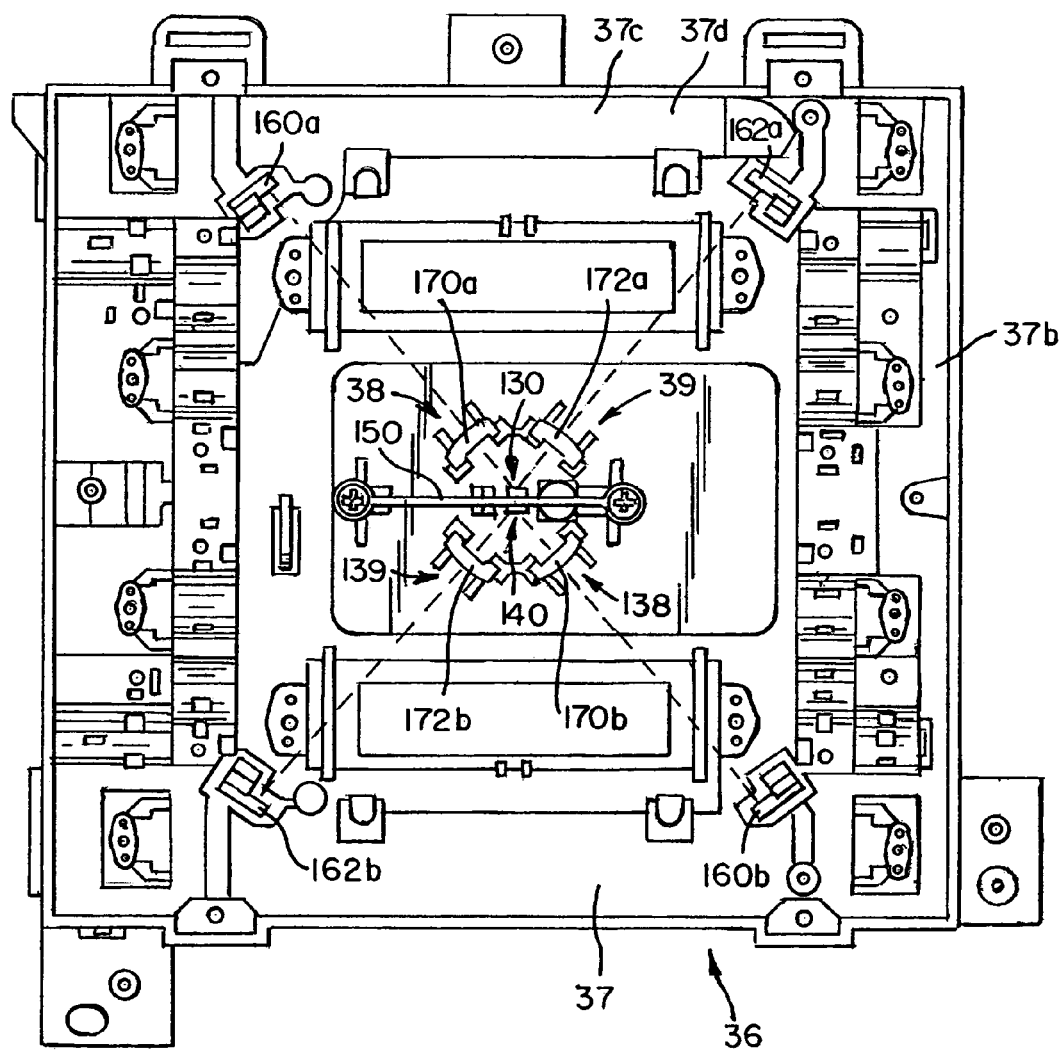
FIG. 3 is a view of the printhead illustrating the bottom section of the printhead housing with F-1 and F-2 lenses and reflection mirrors removed.

In FIG. 3, the first and second F-1 lenses 120a, 120b, the first, second, third, and fourth F-2 lenses 122a–122d, and the mirrors 102a, 102b, 104a, 104b, 106a, 106b, 108a, 108b, 110a, 110b have been removed to more clearly illustrate the circuit board 150 and first and second sensors 130, 140.

A first start-of-scan mirror 160a is mounted in the printhead housing 37 such that when the first beam 52a reaches a start-of-scan location along its scan path, it strikes the first start-of-scan mirror 160a. The mirror 160a reflects the first beam 52a towards the first sensor 130, see FIGS. 3–5 and 3A. Prior to striking the first sensor 130, the first beam 52a passes through a first start-of-scan lens 170a. A first end-of-scan mirror 162a is mounted in the printhead housing 37 such that when the first beam 52a reaches an end-of-scan location along its scan path, it is reflected by the first end-of-scan mirror 162a towards the first sensor 130. Prior to striking the first sensor 130 a second time, the first beam 52a passes through a first end-of-scan lens 172a. When the third beam 62a reaches a start-of-scan location along its scan path, it is reflected by a second start-of-scan mirror 160b towards the second sensor 140. Prior to striking the second sensor 140, the third beam 62a passes through a second start-of-scan lens 170b. When the third beam 62a reaches an end-of-scan location along its scan path, it is reflected by a second end-of-scan mirror 162b towards the second sensor 140. Prior to striking the second sensor 140 a second time, the third beam 62a passes through a second end-of-scan lens 172b.

The first sensor 130 generates a corresponding start-of-scan signal, i.e., a first start-of-scan signal, when the first beam 52a strikes it and the second sensor 140 generates a corresponding start-of-scan signal, i.e., a second start-of-scan signal, when the third beam 62a strikes it. The controller 12 waits a predefined time period, i.e., a first detect-to-print time, after receiving the first start-of-scan signal from the first sensor 130 before it begins sending corresponding video signals to the first and second laser diodes 52 and 54 to effect the writing of Pels by the scanning laser beams 52a and 54a along the drums 28C and 26M. Likewise, the controller 12 waits a predefined time period, i.e., a second detect-to-print time, which may be different from the first detect-to-print time, after receiving the second start-of-scan signal from the second sensor 140 before it begins sending corresponding video signals to the third and fourth laser diodes 62 and 64 to effect the writing of Pels by the scanning laser beams 62a and 64a along the drums 22K and 24Y. It is also contemplated that the controller 12 may wait an additional time period corresponding to a random number offset, which additional time period is added to the detect-to-print time, prior to writing Pels to one or more of the drums 22K, 24Y, 26M, 28C, see the patent application entitled "Systems for Performing Laser Beam Linearity Correction and Algorithms and Methods for Generating Linearity Correction Tables from Data Stored in an Optical Scanner," which has previously been incorporated by reference herein.

Each of the first and second sensors 130 and 140 generates a pulse each time its corresponding beam 52a, 62a strikes it. The controller 12, based upon the time period between sequential pulses, determines which pulses are start-of-scan pulses and which are end-of-scan pulses. In the illustrated embodiment, the time period between when the first or third beam 52a, 62a is located at its start-of-scan position and its end-of-scan position is longer than the time period between when the beam 52a, 62a is located at an end-of-scan position for a first scan line and a start-of-scan position for a next scan line. Hence, the controller 12 knows that if the time period between a first pulse and a second pulse is greater than the time period between the second pulse and a third pulse, then the first pulse corresponds to a start-of-scan pulse and the second pulse corresponds to an end of scan pulse for a common scan line while the third pulse is the start-of-scan pulse for a subsequent scan line.

It is contemplated that the time period between the start-of-scan and end-of-scan signals generated by the first sensor 130 may be determined by the controller 12 and used to determine line length drift, i.e., change, in the scan direction for the first and second beams 52a, 54a. Likewise, it is contemplated that the time period between the start-of-scan and end-of-scan signals generated by the second sensor 140 may be determined by the controller 12 and used to determine line length drift, i.e., change, in the scan direction for the third and fourth beams 62a, 64a. The time period between the start-of-scan and end-of-scan signals for the first sensor 130 may be different from the time period between the start-of-scan and end-of-scan signals for the second sensor 140. Any change in the line length of one image plane relative to the remaining image planes may be corrected by changing the corresponding detect-to-print time and/or changing the timing of various Pel clock pulses, wherein a Pel clock pulse corresponds to each written Pel or Pel location along a scan line, as noted in the patent application entitled "Systems for Performing Laser Beam Linearity Correction and Algorithms and Methods for Generating Linearity Correction Tables from Data Stored in an Optical Scanner," which application is incorporated herein by reference above.

Because the paths of the first and second laser beams 52a and 54a are redirected by the first pre-scan lens 56a such that the beams 52a, 54a strike the polygonal mirror 70 at or near a common point, the beams move along their corresponding scan paths in unison. Hence, when the first start-of-scan signal is generated by the first sensor 130, the controller 12 knows that the first beam 52a is at its start-of-scan location and, further, presumes that the second beam 54a is also at its corresponding start-of-scan location. Similarly, when the first end-of-scan signal is generated by the first sensor 130, the controller 12 knows that the first beam 52a is at its end-of-scan location and, further, presumes that the second beam 54a is also at its corresponding end-of-scan location. When the second start-of-scan signal is generated by the second sensor 140, the controller 12 knows that the third beam 62a is at its start-of-scan location and, further, presumes that the fourth beam 64a is also at its corresponding start-of-scan location. Likewise, when the second end-of-scan signal is generated by the second sensor 140, the controller 12 knows that the third beam 62a is at its end-of-scan location and, further, presumes that the fourth beam 64a is also at its corresponding end-of-scan location. By providing only a single first sensor 130 to generate start-of-scan and end-of-scan signals for the first and second beams 52a, 54, and a single second sensor 140 to generate start-of-scan and end-of-scan signals for the third and fourth beams 62a, 64a, the number of start-of-scan and end-of-scan sensors required is substantially reduced.

Figure 6A:
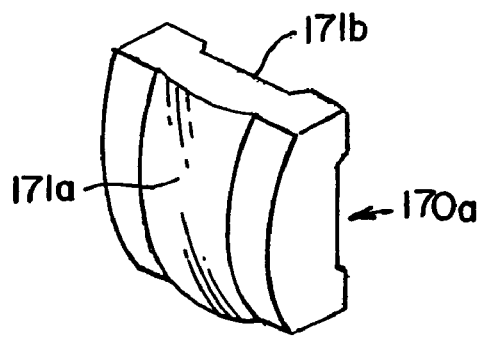
FIGS. 6A and 6B are perspective views of a start-of-scan lens.
Figure 6B:
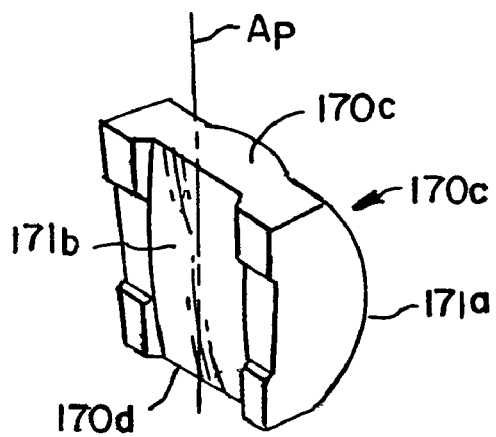
Figure 6C:
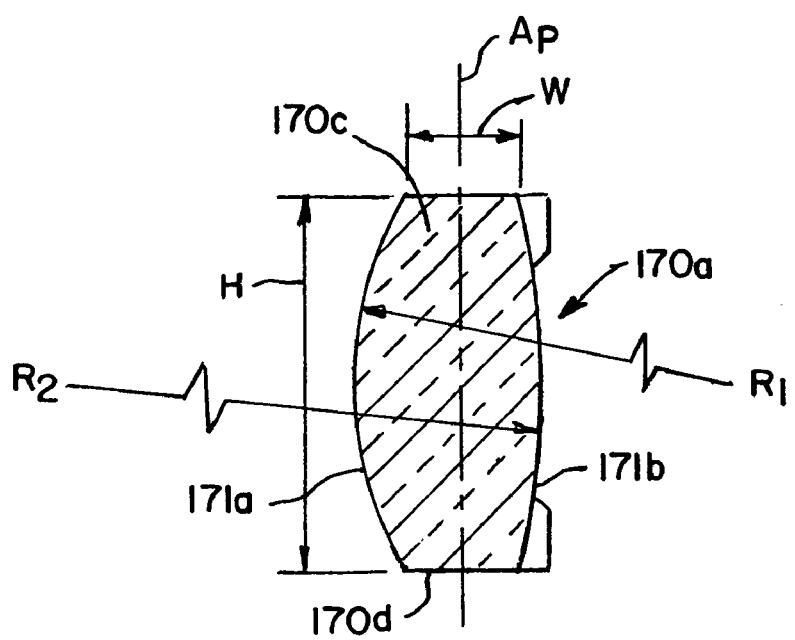
FIG. 6C is a sectional view of the lens illustrated in FIGS. 6A and 6B.

Each of the start-of-scan and end-of-scan lenses 170a, 170b, 172a, 172b is formed from a polymeric material such as an optical grade acrylic. As each of the lenses 170a, 170b, 172a, 172b is of generally the same shape and size, and the lenses 170a, 170b, 172a, 172b are interchangeable with one another, only lens 170a, illustrated in FIGS. 6A–6C, is discussed in detail herein. The lens 170a comprises a convex spherical surface 171a having, in the illustrated embodiment, a radius $R_1$ equal to about 9.5 mm. The spherical surface 171a functions to focus or converge the first beam 52a substantially equally in all directions. By focusing the beam 52a in this way, the printhead 36 can be made more compact. That is, the distance the beam 52a must travel between a mirror facet 72 and the first sensor 130 can be reduced so as to be less than the distance the beam 52a travels between the same facet 72 and the photoconductive drum 28C. Due to the focusing effected by the spherical surface 171a of the lens 170a, the spot size of the beam 52a, at least in the scan direction, is substantially the same at both the first sensor 130 and the photoconductive drum 28C. Hence, the sensor 130 sees substantially the same spot size, at least in the scan direction, as the drum 28C.

The lens 170a further comprises a convex cylindrical surface 171b having, in the illustrated embodiment, a radius $R_2$ equal to about 28.242 mm, see FIG. 6C. The width W of lens 170a between the spherical and cylindrical surfaces 171a, 171b may be approximately 6 mm, while the height H of the lens 170a may be approximately 12 mm. The cylindrical surface 171b functions to focus the beam 52a in a direction substantially parallel to a process dimension axis $A_p$ of the lens 170a, which axis $A_p$ is substantially orthogonal to upper and lower surfaces 170c and 170d of the lens 170a, see FIG. 6C.

Figures 7A, 7B:
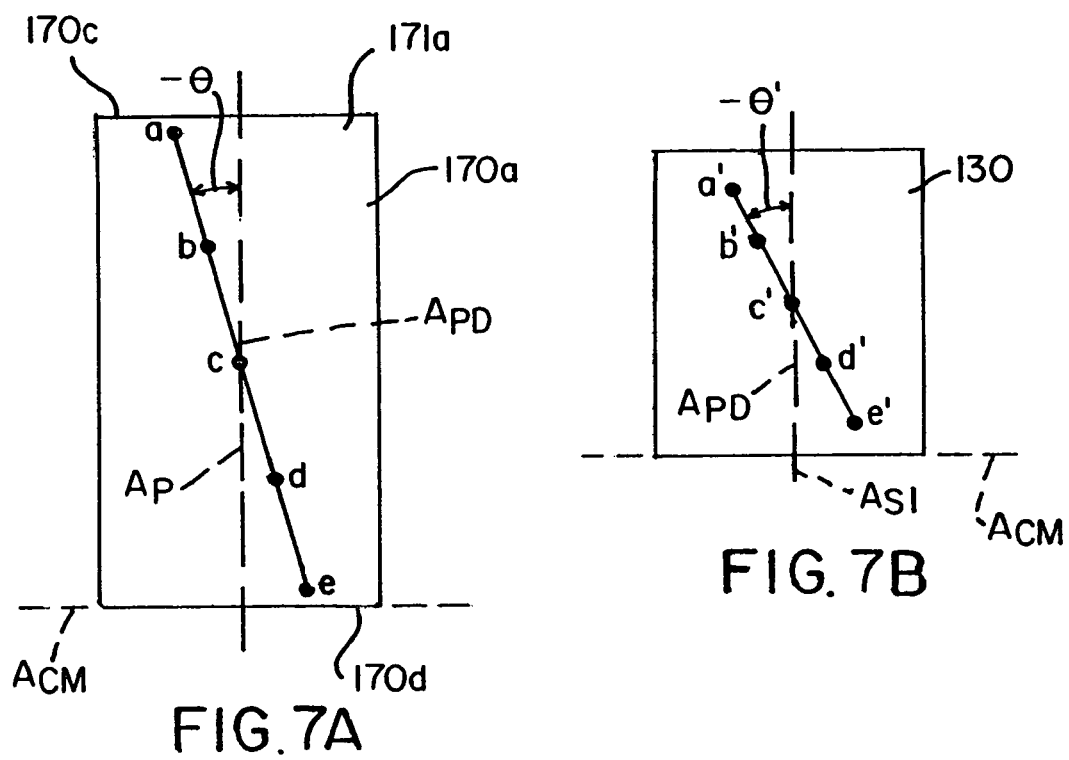
FIG. 7A is a schematic view illustrating rays of the first beam prior to passing through the first start-of-scan lens.
FIG. 7B is a schematic view illustrating rays of the first beam while the first beam is at its start-of-scan location prior to striking the first sensor.
Figure 8A:
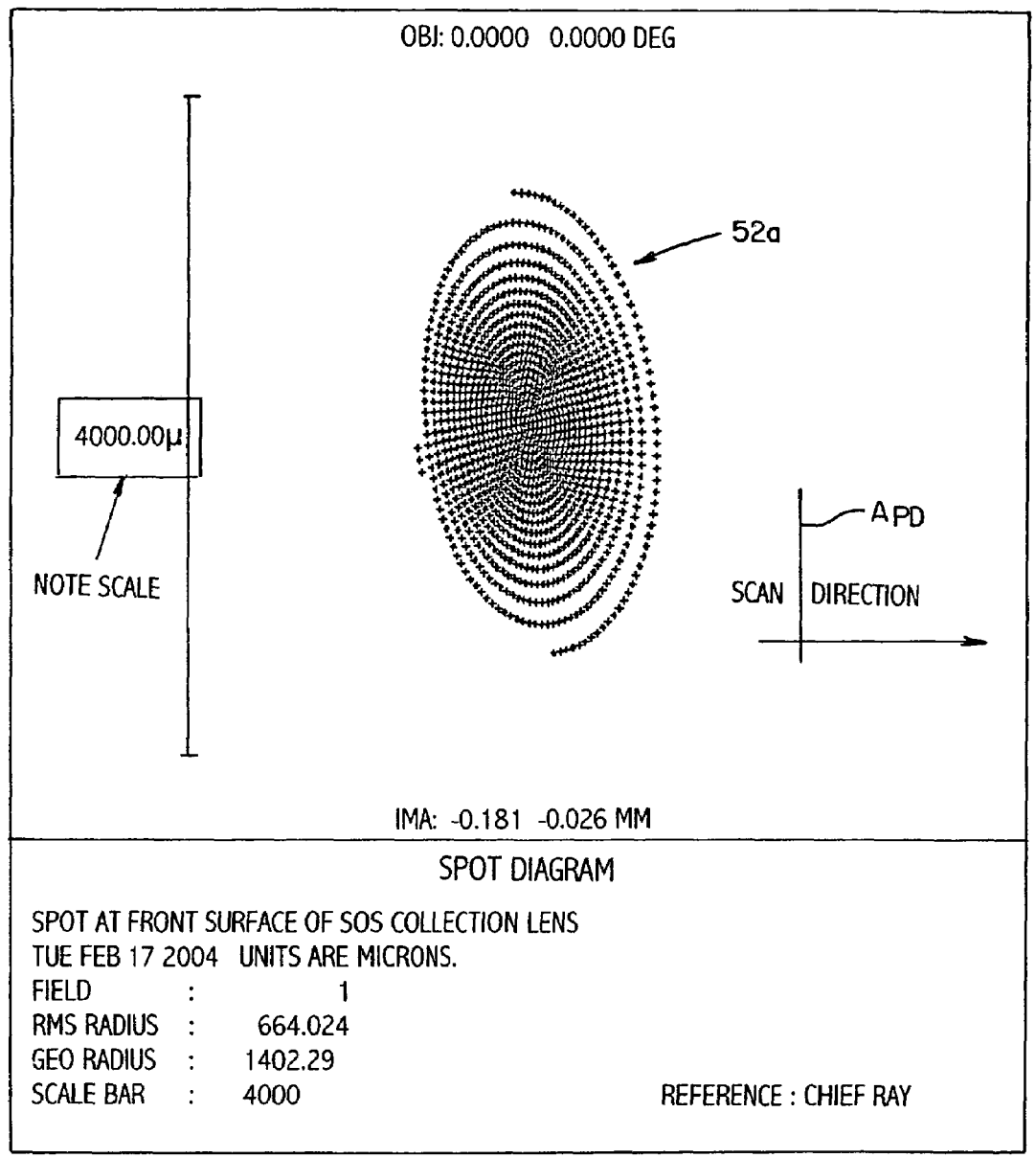
FIGS. 8A–8D are illustrations of the first beam at its start-of-scan location generated by conventional optical modeling software.

FIG. 7A illustrates in schematic form rays a–e of the first beam 52a prior to those rays passing through the spherical surface 171a of the first start-of-scan lens 170a. In FIG. 7A, the lens 170a is presumed positioned such that its upper and lower surfaces 170c and 170d are substantially orthogonal to a process direction axis $A_{PD}$ axis of the printhead housing 37 and the lower surface 170d is substantially parallel to a central member axis $A_{CM}$ of the printhead housing 37. The process direction axis $A_{PD}$ of the housing 37 is substantially parallel with the rotational axis 70a. As is apparent from FIG. 7A, the beam 52a is rotated in a first direction, counter-clockwise when viewing FIG. 7A, at an angle −θ, relative to the process direction axis $A_{PD}$ of the printhead housing 37 prior to passing through the first start-of-scan lens 170a. This rotation of the first beam 52a is further shown in the illustration of FIG. 8A, which illustration was generated using an optical modeling program entitled "ZEMAX Optical Design Program," which is commercially available from ZEMAX Development Corporation, San Diego, Calif. Hence, FIG. 8A illustrates an optical model of the spot of the first beam 52a prior to it passing through the start-of-scan lens 170a. It is believed that rotation of the beam 52a in the first direction results substantially from the beam 52a striking a mirror facet 72 at an oblique angle in the process direction.

Figure 9A:
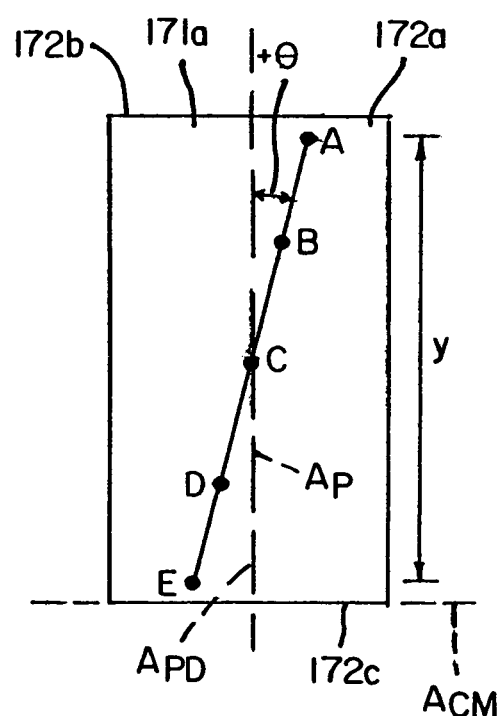
FIG. 9A is a schematic view illustrating rays of the first beam prior to passing through the first end-of-scan lens.
Figure 10A:
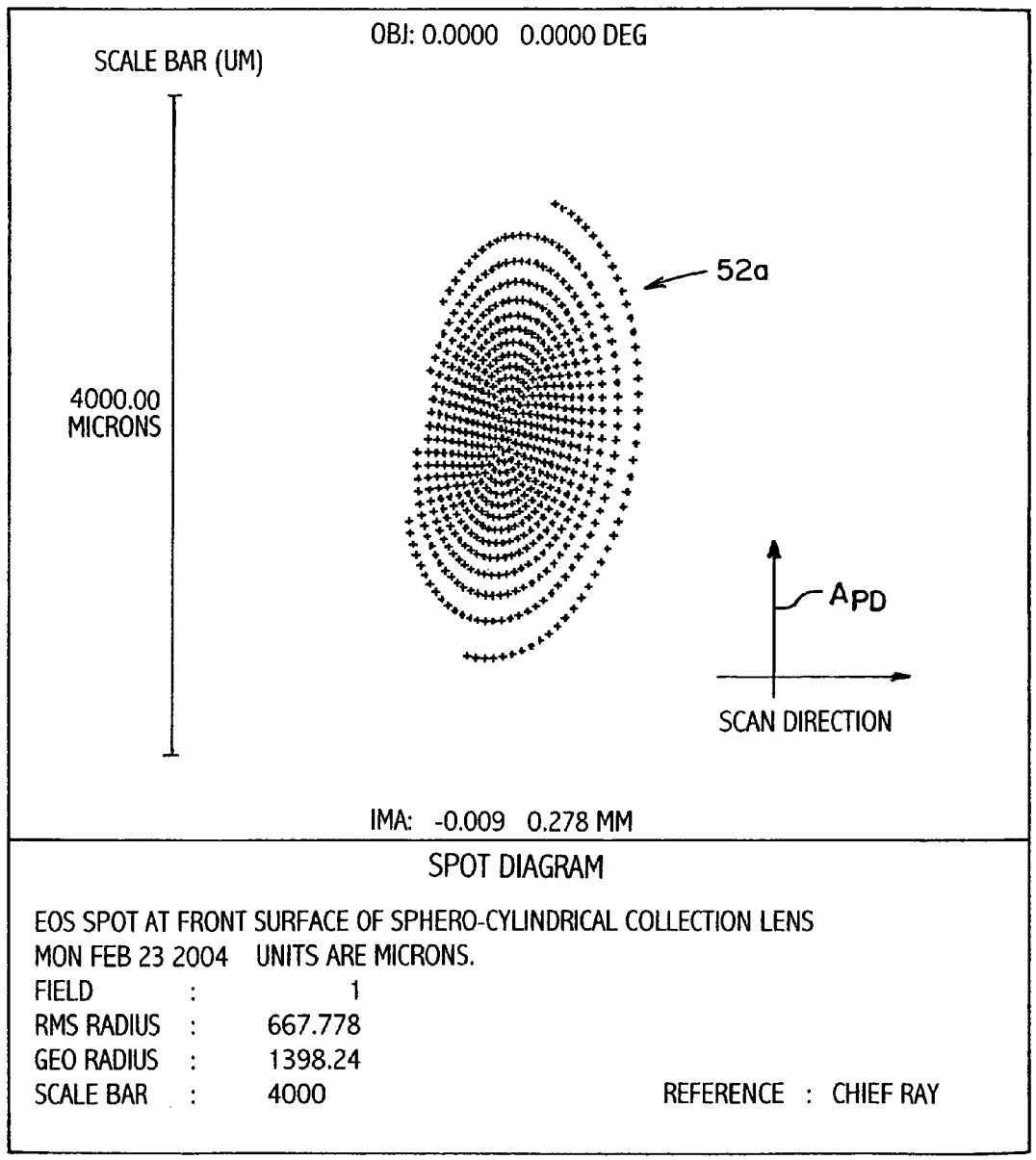
FIGS. 10A–10D are illustrations of the first beam at its end-of-scan location generated by conventional optical modeling software.

FIG. 9A illustrates in schematic form rays A–E of the first beam 52a prior to those rays A–E passing through a spherical surface 171a of the first end-of-scan lens 172a. In FIG. 9A, the lens 170a is presumed to be positioned such that its upper and lower surfaces 172b and 172c are substantially orthogonal to the process direction axis $A_{PD}$ axis of the printhead housing 37 and the lower surface 172c is substantially parallel to the central member axis $A_{CM}$ of the printhead housing 37. As is apparent from FIG. 9A, the first beam 52a is rotated in a second direction, clockwise when viewing FIG. 9A, opposite to the first direction, through an angle +θ relative to the process direction axis $A_{PD}$ of the housing 37 prior to it passing through the first end-of-scan lens 172a. This rotation of the first beam spot is further shown in the illustration in FIG. 10A, which illustration was generated using the ZEMAX Optical Design Program noted above. Hence, FIG. 10A illustrates an optical model of the spot of the first beam 52a prior to it passing through the spherical surface of the end-of-scan lens 172a. It is believed that rotation of the beam 52a in the second direction results substantially from the beam 52a striking the mirror facet 72 at an oblique angle in the process direction. It is further believed that the beam 52a is rotated in the second direction, rather than in the first direction, because the beam 52a, when at its end-of-scan location, contacts an end 72b of the facet 72 opposite the end 72a contacted by the beam 52a when at its start-of-scan location.

Figure 8B:
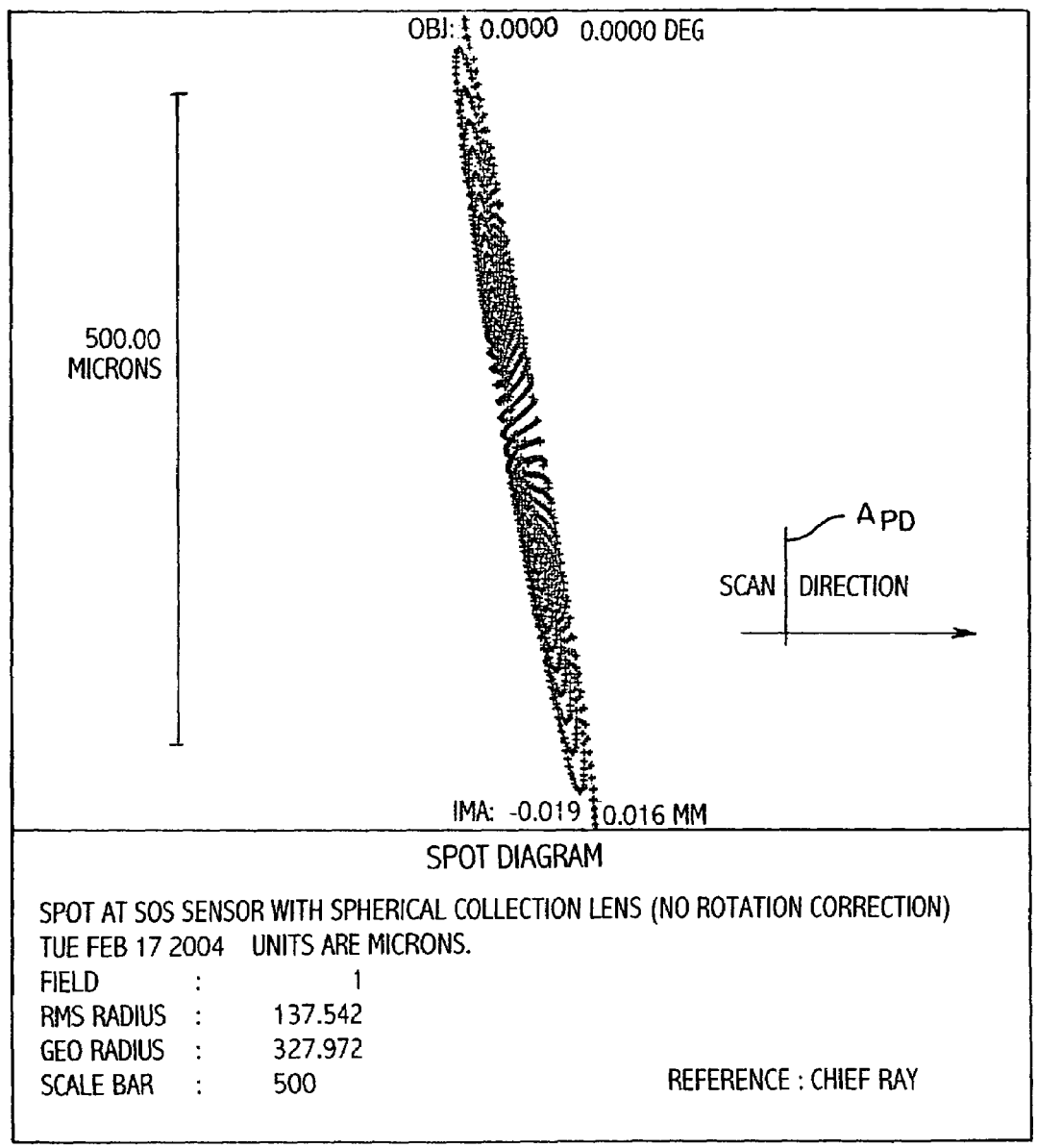
Figure 8C:
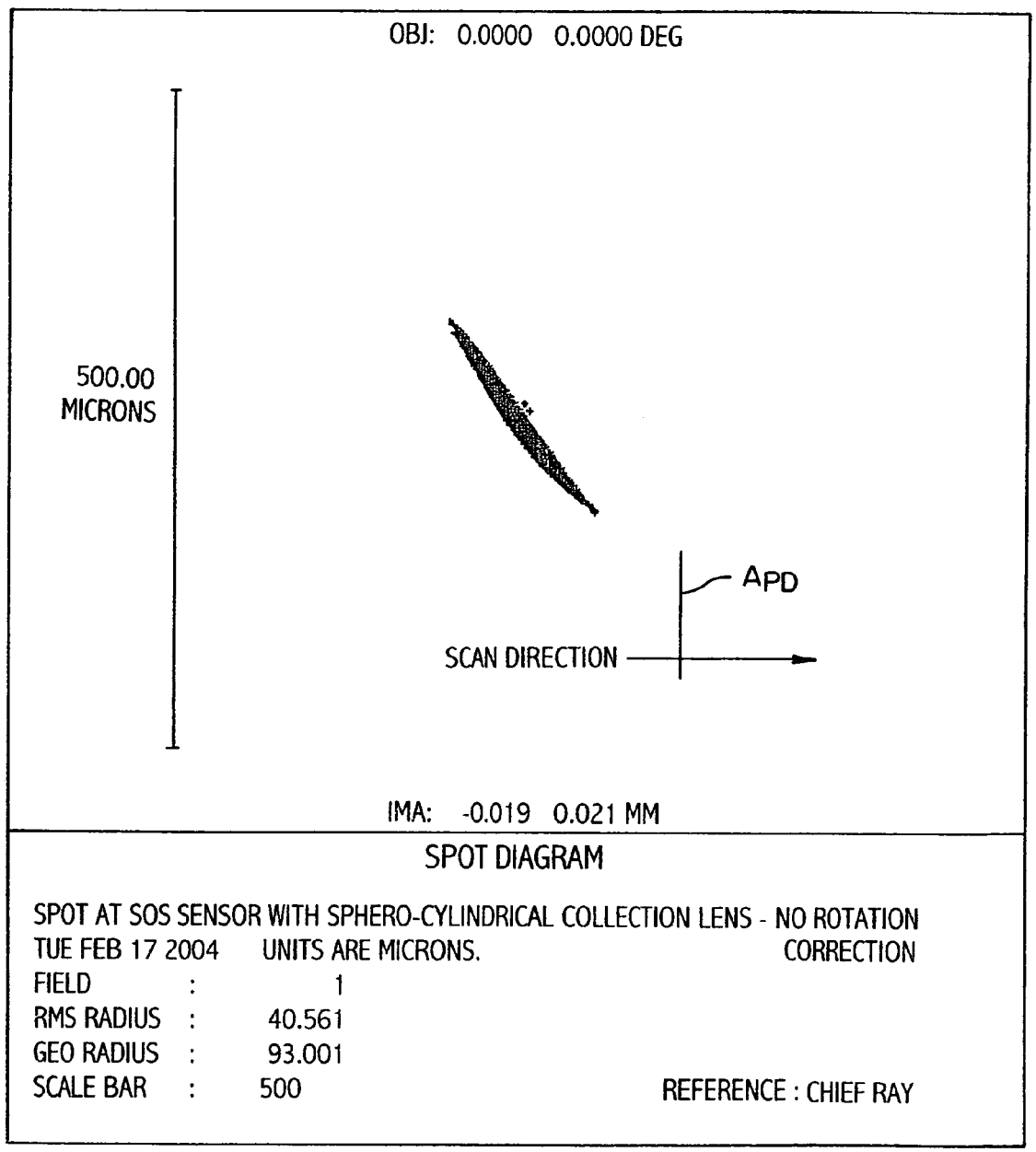

A modeled illustration of the beam 52a, after passing only through the spherical surface 171a of the first lens 170a, is illustrated in FIG. 8B. As noted above, the spherical surface 171a functions to focus the beam 52a equally in all directions. A modeled illustration of the beam 52a after passing through the cylindrical surface 171b of the first lens 170a and prior to striking the first sensor 130 is illustrated in FIG. 8C. In FIG. 8C, the first lens 170a is presumed to be positioned such that its process dimension axis $A_P$ is substantially parallel to the process direction axis $A_{PD}$ of the printhead housing 37. As noted above, the cylindrical surface 171b functions to focus the beam 52a in a direction substantially parallel to the process dimension axis $A_P$ of the lens 170a. By doing so, the size of the beam 52a is reduced in a direction substantially parallel to the process dimension axis $A_P$ of the lens 170a and, further, the beam 52a is additionally rotated. This is illustrated schematically in FIG. 7B, where rays a'–e' are positioned at an angle $-\theta'$, which angle is greater than angle $-\theta$ shown in FIG. 7A, prior to striking first sensor 130.

Figure 9B:
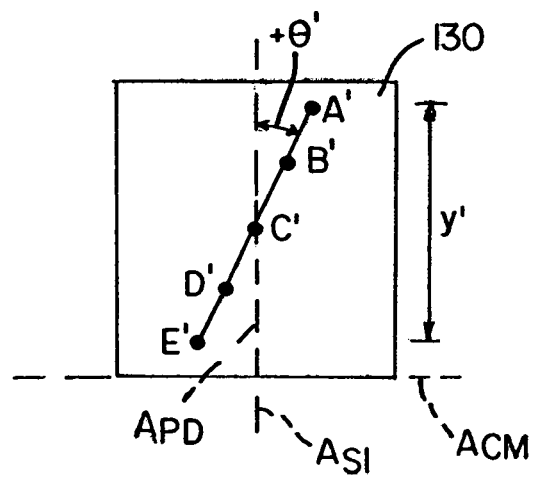
FIG. 9B is a schematic view illustrating rays of the first beam while the first beam is at its end-of-scan location prior to striking the first sensor.
Figure 10B:
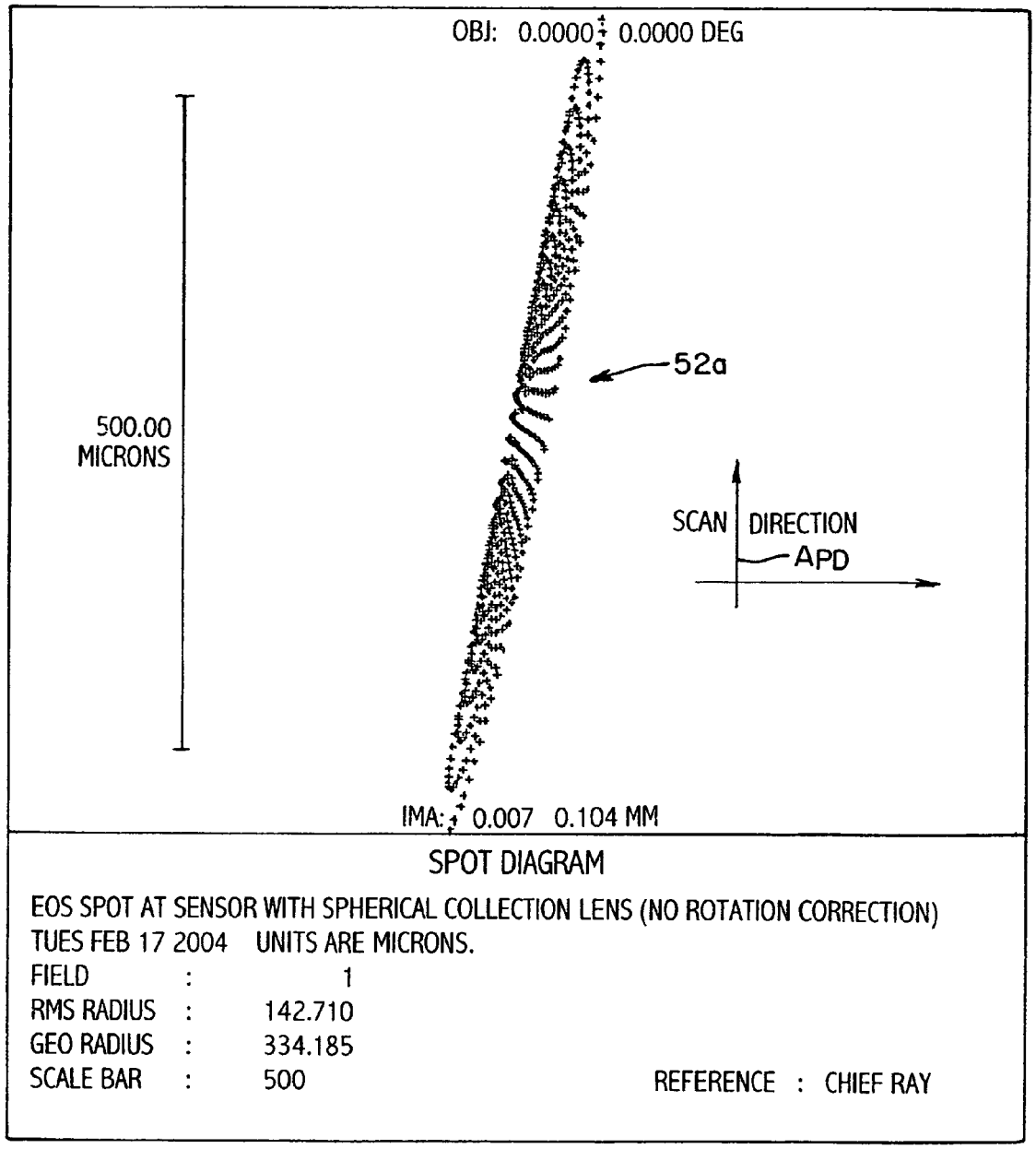
Figure 10C:
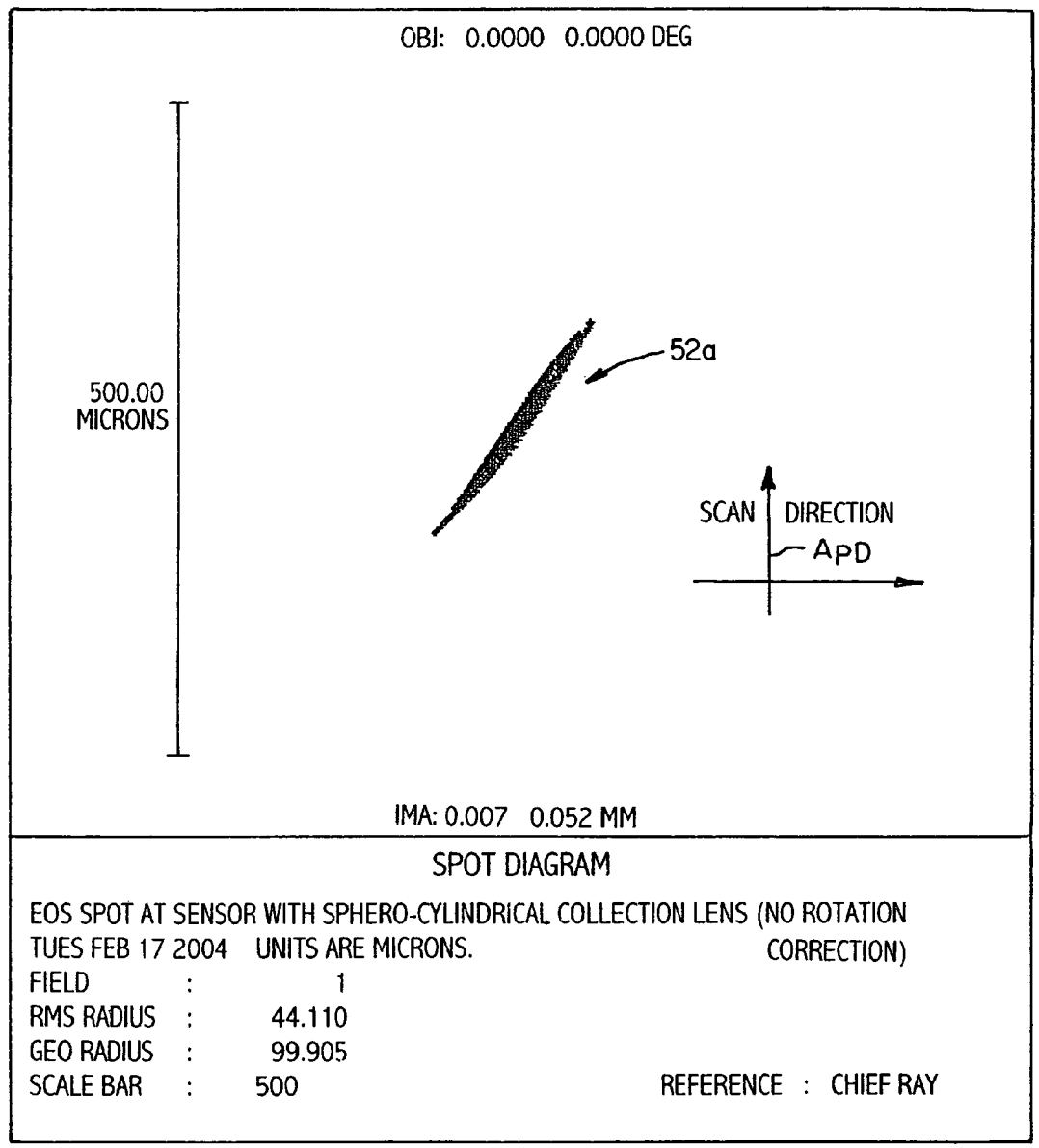

A modeled illustration of the beam 52a, after passing only through the spherical surface of the first end-of-scan lens 172a, is illustrated in FIG. 10B. A modeled illustration of the beam 52a after passing through the cylindrical surface of the first end-of-scan lens 172a and prior to striking the first sensor 130 is illustrated in FIG. 10C. In FIG. 10C, the first end-of-scan lens 172a is presumed to be positioned such that its process dimension axis is substantially parallel to the process direction axis $A_{PD}$ of the printhead housing 37. As is apparent from FIG. 10C, the size of the beam 52a is reduced in a direction substantially parallel to the process dimension axis of the lens 172a and, further, the beam 52a is additionally rotated. This is illustrated schematically in FIG. 9B, where rays A'–E' are positioned at an angle $+\theta'$, which angle is greater than angle $+\theta$ shown in FIG. 9A, prior to striking first sensor 130.

It is believed that the first sensor 130 will generate start-of-scan and end-of-scan signals more consistently and accurately if the beam 52a strikes the sensor 130 with little or no rotation, i.e., with rays a'–e', illustrated in FIG. 7B, and rays A'–E', illustrated in FIG. 9B, positioned along an axis substantially parallel to a process direction axis $A_{S1}$ of the first sensor 130. The process direction axis $A_{S1}$, of the first sensor 130 is substantially parallel to the process direction axis $A_{PD}$ of the printhead 76, see FIGS. 7B and 9B.

Figure 11:
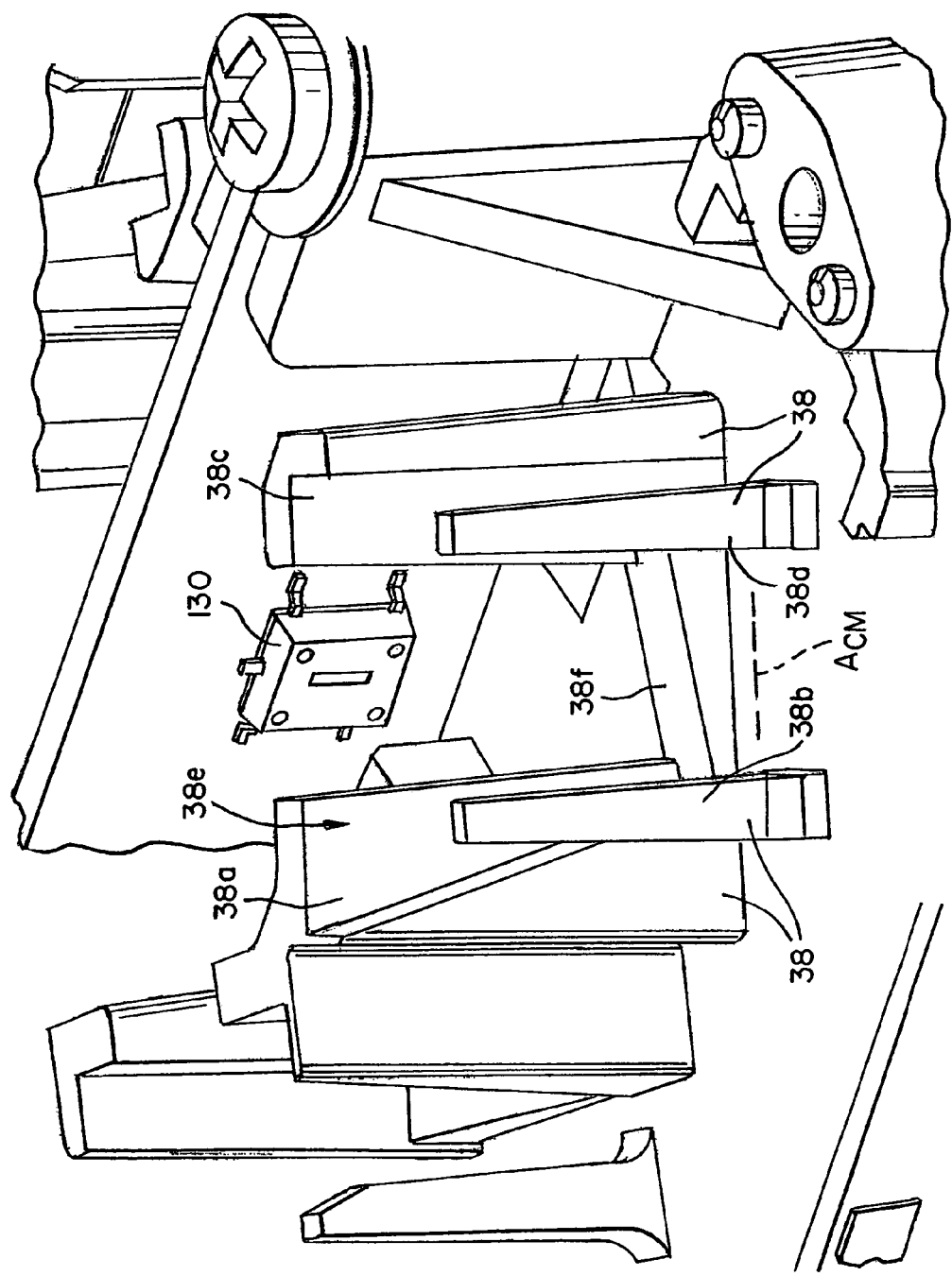
FIG. 11 is a perspective view of a rotated lens holder formed in the printhead housing for a first start-of-scan lens.

So as to reposition the beam 52a such that it has substantially no rotation when the beam 52a strikes the first sensor 130 while at its start-of-scan location, the first start-of-scan lens 170a is rotated so that its process dimension axis $A_P$ is at an angle equal to $-\theta$ (i.e., the angle of rays a–e in FIG. 7A) relative to the process direction axis $A_{PD}$ of the housing 37 and, more preferably, an angle of from about $-\theta+-1$ degrees to about $-\theta+-3$ degrees relative to the axis $A_{PD}$. In the illustrated embodiment, the printhead housing 37 is formed with a first start-of-scan holder 38 comprising first, second, third and fourth support beams 38a–38d which define a pocket 38e for receiving the lens 170a, see FIG. 11. The holder 38 further comprises a base 38f positioned at an angle with regard to the central member axis $A_{CM}$ of the printhead housing 37, which axis $A_{CM}$ is substantially parallel to an upper surface 37e of the central member 37d. The angle of the base 38f is selected such that the process dimension axis $A_P$ of the lens 170a is rotated in the first direction at an angle equal to $-\theta$ relative to the process direction axis $A_{PD}$ of the housing 37 and, more preferably, at an angle of from about $-\theta+-1$ degrees to about $-\theta+-3$ degrees relative to the axis $A_{PD}$.

Figure 8D:
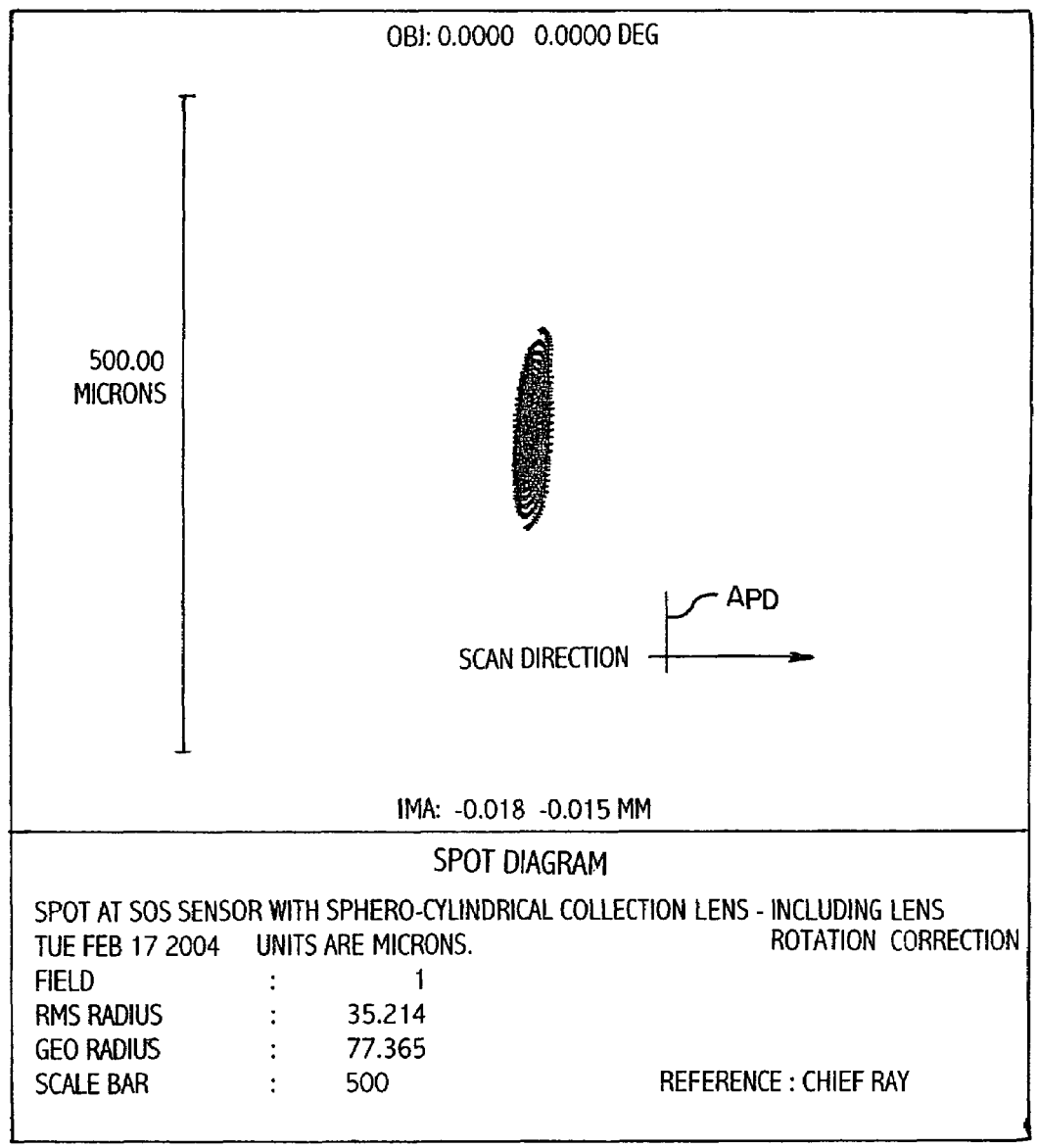

The beam illustrated in FIG. 8A is believed to be positioned at an angle of about $-8$ degrees relative to the process direction axis $A_{PD}$ of the housing 37. FIG. 8D illustrates the position of the beam presuming the first start-of-scan lens 170a is rotated to an angle of about $-10$ degrees relative to the process direction axis $A_{PD}$ of the housing 37. As is apparent from FIG. 8D, the beam has substantially no rotation relative to the process direction axis $A_{PD}$ of the housing 37.

Figure 12:
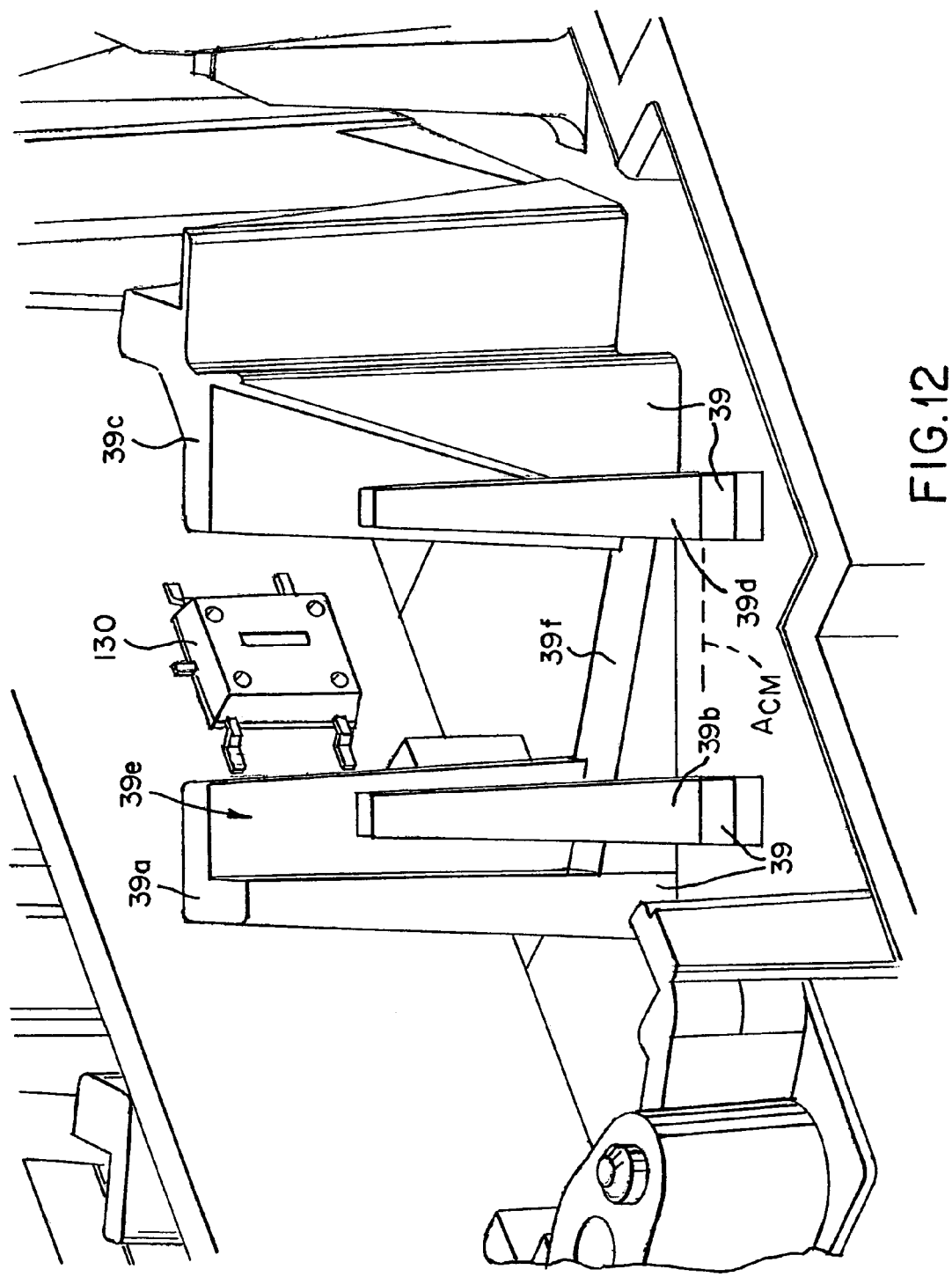
FIG. 12 is a perspective view of a rotated lens holder formed in the printhead housing for a first end-of-scan lens.

So as to reposition the beam 52a such that it has substantially no rotation when it strikes the first sensor 130 while at its end-of-scan location, the first end-of-scan lens 172a is rotated such that its process dimension axis $A_P$ is at an angle equal to $+\theta$ (i.e., the angle of rays A–E in FIG. 9A) relative to the process direction axis $A_{PD}$ of the housing 37 and, more preferably, an angle of from about $+\theta+1$ degrees to about $+\theta+3$ degrees relative to the axis $A_{PD}$. In the illustrated embodiment, the printhead housing 37 is formed with a first end-of-scan holder 39 comprising first, second, third and fourth support beams 39a–39d which define a pocket 39e for receiving the lens 172a, see FIG. 12. The holder 39 further comprises a base 39f positioned at an angle with regard to the central member axis $A_{CM}$ of the printhead housing 37. The angle of the base 39f is selected such that the process dimension axis $A_P$ of the lens 172a is rotated in the second direction at an angle equal to $+\theta$ relative to the process direction axis $A_{PD}$ of the housing 37 and, more preferably, at an angle of from about $+\theta+1$ degree to about $+\theta+3$ degrees relative to the axis $A_{PD}$.

Figure 10D:
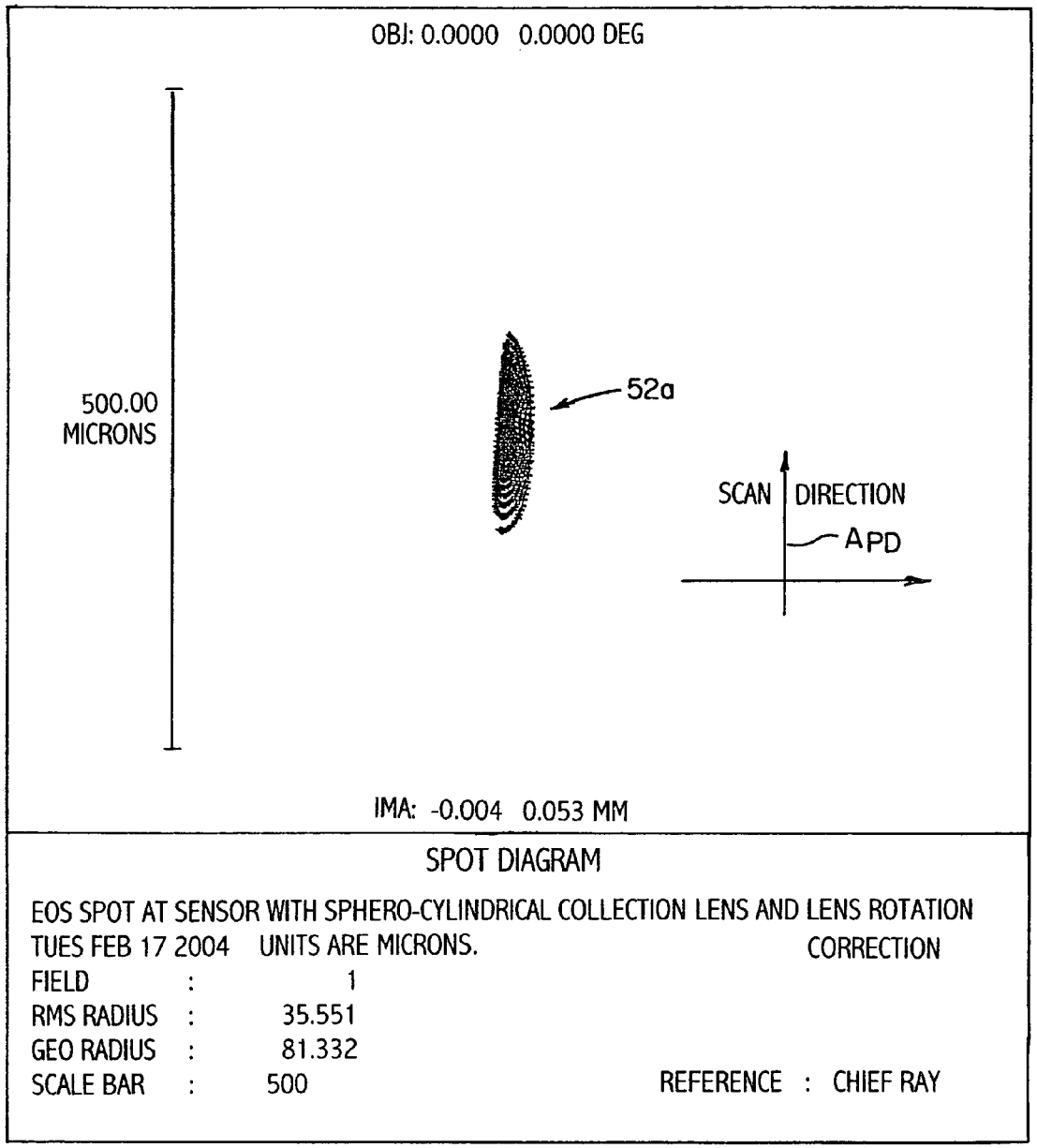

The beam illustrated in FIG. 10A is believed to be positioned at an angle of about $+8$ degrees relative to the process direction axis $A_{PD}$ of the housing 37. FIG. 10D illustrates the position of the beam presuming the first end-of-scan lens 172a is rotated to an angle of about $+10$ degrees relative to the process direction axis $A_{PD}$ of the housing 37. As is apparent from FIG. 10D, the beam has substantially no rotation relative to the process direction axis $A_{PD}$ of the housing 37.

Just as the first beam 52a is rotated in the first direction relative to the process direction axis $A_{PD}$ of the housing 37 when it is positioned at its start-of-scan location, the third beam 62a is likewise rotated in a first direction relative to the axis $A_{PD}$ when located at its start-of-scan position. So as to reposition the beam 62a such that it has substantially no rotation when it strikes the second sensor 140 while at its start-of-scan location, the second start-of-scan lens 170b is rotated such that its process dimension axis $A_P$ is at an angle equal to $-\theta$ relative to the process direction axis $A_{PD}$ of the housing 37 and, more preferably, an angle of from about $-\theta+-1$ degrees to about $-\theta+-3$ degrees relative to the axis $A_{PD}$. In the illustrated embodiment, the printhead housing 37 is formed with a second start-of-scan holder 138, which is similar in construction to the first start-of-scan holder 38. The base (not shown) of the holder 138 is positioned at an angle with regard to the central member axis $A_{CM}$ of the printhead housing 37. The angle of the base is selected such that the process dimension axis $A_P$ of the lens 170b is rotated in the first direction at an angle equal to $-\theta$ relative to the process direction axis $A_{PD}$ of the housing 37 and, more preferably, at an angle of from about $-\theta+-1$ degrees to about $-\theta+-3$ degrees relative to the axis $A_{PD}$.

Just as the first beam 52a is rotated in the second direction relative to the process direction axis $A_{PD}$ of the housing 37 when it is positioned at its end-of-scan location, the third beam 62a is likewise rotated in a second direction relative to the axis $A_{PD}$ when positioned at its end-of-scan location. So as to reposition the beam 62a such that it has substantially no rotation when it strikes the second sensor 140 while at its end-of-scan location, the second end-of-scan lens 172b is rotated such that its process dimension axis $A_P$ is at an angle equal to $+\theta$ relative to the process direction axis $A_{PD}$ of the housing 37 and, more preferably, an angle of from about $+\theta+1$ degrees to about $+\theta+3$ degrees relative to the axis $A_{PD}$. In the illustrated embodiment, the printhead housing 37 is formed with a second end-of-scan holder 139 which is constructed in essentially the same manner as the first end-of-scan holder 39. The base (not shown) of the holder 139 is positioned at an angle with regard to the central member axis $A_{CM}$ of the printhead housing 37. The angle of the base is selected such that the process dimension axis $A_P$ of the lens 172b is rotated in the second direction at an angle equal to $+\theta$ relative to the process direction axis $A_{PD}$ of the housing 37 and, more preferably, at an angle of from about $+\theta+1$ degree to about $+\theta+3$ degrees relative to the axis $A_{PD}$.

Figure 3A:
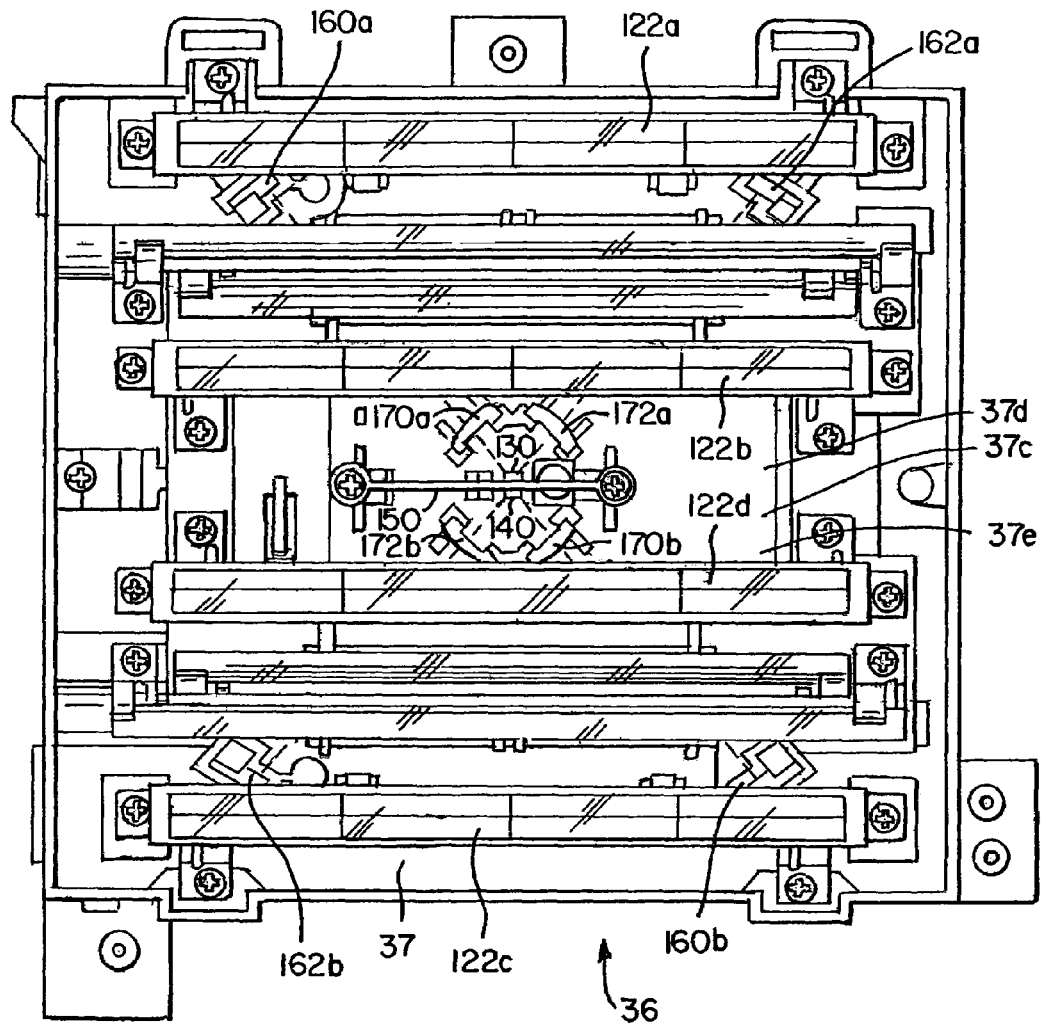
FIG. 3A is a view similar to FIG. 3 with the F-1 and F-2 lenses and the reflection mirrors provided.

As is apparent from FIGS. 3 and 3A, the first and second beams 52a and 62a strike their corresponding sensors 130 and 140 at oblique angles. So as to ensure that the sensors 130 and 140 generate accurate and consistent start-of-scan and end-of-scan signals, it is preferred that the laser beam power for each of beams 52a and 62a be maintained substantially constant as they pass through their start-of-scan and end-of-scan locations throughout operation of the image forming apparatus 10. It is also preferred that the power of the laser diodes 52 and 62 be increased or boosted during start-of-scan and end-of-scan sensing. In a preferred embodiment, the power of each laser diode 52, 62 is boosted to full power, e.g., 180 microwatts.

What is claimed is:

1. A laser scanning unit comprising:
a housing;
a scanning device;
a pre-scan assembly generating a light beam and directing said light beam toward said scanning device; and
a post-scan assembly receiving a scanning beam reflected from said scanning device and causing said beam to traverse a photoconductive member along a scan path, said post-scan assembly comprising a sensor for detecting the beam at a start-of-scan location and an end-of-scan location spaced from said start-of-scan location along said scan path.

2. A laser scanning unit as set forth in claim 1, wherein said post-scan assembly further comprises a first element for directing said light beam toward said sensor to sense the beam at said start-of-scan location along said scan path and a second element for directing said beam toward said sensor to sense the beam at said end-of-scan location along said scan path.

3. A laser scanning unit as set forth in claim 2, wherein said scanning device comprises a rotating polygonal mirror having at least one facet, said pre-scan assembly directing said light beam toward said at least one facet at an oblique angle.

4. A laser scanning unit as set forth in claim 1, wherein said post-scan assembly further comprises:
a first lens positioned prior to said sensor for receiving said beam when it is at said start-of-scan location and focusing said beam onto said sensor; and
a second lens positioned prior to said sensor for receiving said beam when it is at said end-of-scan location and focusing said beam onto said sensor.

5. A laser scanning unit as set forth in claim 4, wherein said beam is rotated in a first direction relative to a process direction axis of said housing at said start-of-scan location and said beam is rotated in a second direction relative to said process direction axis at said end-of-scan location, said first direction being opposite said second direction.

6. A laser scanning unit as set forth in claim 5, wherein said first lens has a cylindrical surface for focusing said beam in a direction substantially parallel to a first lens process dimension axis and said second lens has a cylindrical surface for focusing said beam in a direction substantially parallel to a second lens process dimension axis.

7. A laser scanning unit as set forth in claim 6, wherein said first lens is rotated in said first direction such that its first lens axis is positioned at an angle relative to said process direction axis of said housing so as to correct at least a portion of said beam rotation in said first direction.

8. A laser scanning unit as set forth in claim 7, wherein said first lens is positioned such that its first lens axis is positioned at an angle relative to said process direction axis which is greater than the angle at which said beam is rotated relative to said process direction axis at said start-of-scan location.

9. A laser scanning unit as set forth in claim 6, wherein said second lens is rotated in said second direction such that its second lens axis is positioned at an angle relative to said process direction axis so as to correct at least a portion of said beam rotation in said second direction.

10. A laser scanning unit as set forth in claim 9, wherein said second lens is positioned so that its second lens axis is positioned at angle relative to said process direction axis which is greater than the angle at which the beam is rotated relative to said process direction axis at said end-of-scan location.

11. A laser scanning unit as set forth in claim 6, wherein each of said first and second lenses further comprises a generally spherical surface.

12. A laser scanning unit comprising:
a housing;
a scanning device;
a first pre-scan assembly generating first and second light beams and directing said first and second light beams toward said scanning device;
a second pre-scan assembly generating third and fourth light beams and directing said third and fourth light beams toward said scanning device; and
a post-scan assembly receiving said first, second, third and fourth scanning beams reflected from said scanning device and causing said beams to move along a corresponding scan path, said post-scan assembly comprising:
a first sensor for detecting one of said first and second light beams at a start-of-scan location and an end-of-scan location along a corresponding scan path; and a second sensor for detecting one of said third and fourth light beams at a start-of-scan location and an end-of-scan location along a corresponding scan path.

13. A laser scanning unit as set forth in claim 12, wherein said post-scan assembly further comprises:
  a first element for directing said one of said first and second light beams toward said first sensor to sense said one of said first and second beams at said start-of-scan location along said corresponding scan path and a second element for directing said one of said first and second beams toward said first sensor to sense said one of said first and second beams at said end-of-scan location along said corresponding scan path; and
  a third element for directing said one of said third and fourth light beams toward said second sensor to sense said one of said third and fourth light beams at said start-of-scan location along said corresponding scan path and a fourth element for directing said one of said third and fourth light beams toward said second sensor to sense said one of said third and fourth light beams at said end-of-scan location along said corresponding scan path.

14. A laser scanning unit as set forth in claim 12, wherein said first and second sensors are mounted on a common circuit card.

15. A laser scanning unit as set forth in claim 14, wherein said first and second sensors are mounted adjacent to one another on said circuit card, and said circuit card comprising opaque material where said first and second sensors are mounted.

16. A laser scanning unit as set forth in claim 12, wherein said post-scan assembly further comprises:
  a first lens positioned prior to said first sensor for receiving said one of said first and second light beams when said one of said first and second light beams is at its corresponding start-of-scan location and focusing said one of said first and second light beams onto said first sensor;
  a second lens positioned prior to said first sensor for receiving said one of said first and second light beams when said one of said first and second light beams is at its corresponding end-of-scan location and focusing said one of said first and second light beams onto said first sensor;
  a third lens positioned prior to said second sensor for receiving said one of said third and fourth light beams when said one of said third and fourth light beams is at its corresponding start-of-scan location and focusing said one of said third and fourth light beams onto said second sensor; and
  a fourth lens positioned prior to said second sensor for receiving said one of said third and fourth light beams when said one of said third and fourth light beams is at its corresponding end-of-scan location and focusing said one of said third and fourth light beams onto said second sensor.

17. A laser scanning unit as set forth in claim 16, wherein said scanning device comprises a rotating polygonal mirror having a plurality of facets, said first pre-scan assembly directing said first and second light beams toward a common facet at oblique angles and said second pre-scan assembly directing said third and fourth light beams toward a common facet at oblique angles.

18. A laser scanning unit as set forth in claim 17, wherein said one of said first and second beams is rotated in a first direction relative to a process direction axis of said housing at its corresponding start-of-scan location, and said one of said first and second beams is rotated in a second direction relative to said process direction axis of said housing at its corresponding end-of-scan location, said first direction being opposite said second direction.

19. A laser scanning unit as set forth in claim 18, wherein said first lens has a cylindrical surface for focusing said one of said first and second beams in a direction substantially parallel to a first lens process dimension axis and said second lens has a cylindrical surface for focusing said one of said first and second beams in a direction substantially parallel to a second lens process dimension axis.

20. A laser scanning unit as set forth in claim 19, wherein said first lens is rotated in said first direction such that its first lens axis is positioned at an angle relative to said process direction axis of said housing so as to correct at least a portion of said rotation of said one of said first and second beams in said first direction.

21. A laser scanning unit as set forth in claim 20, wherein said second lens is rotated in said second direction such that its second lens axis is positioned at an angle relative to said process direction axis of said housing so as to correct at least a portion of said rotation of said one of said first and second beams in said second direction.

* * * * *